(12) United States Patent
Di Benedetto et al.

(10) Patent No.: US 7,061,858 B1
(45) Date of Patent: Jun. 13, 2006

(54) HIGH AVAILABILITY ARCHITECTURE FOR NETWORK DEVICES

(75) Inventors: Marco Di Benedetto, Santa Clara, CA (US); Mrinal Baruah, San Jose, CA (US); Chengelpet Veeravalli Ramesh, San Jose, CA (US); Alagu Annaamalai, Saratoga, CA (US); Ramana Mellacheruvu, San Jose, CA (US); Sridhar K. Aswathnarayan, San Jose, CA (US); Hei Tao Fung, Santa Clara, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 781 days.

(21) Appl. No.: 09/714,246

(22) Filed: Nov. 16, 2000

Related U.S. Application Data

(63) Continuation-in-part of application No. 09/644,377, filed on Aug. 23, 2000, now Pat. No. 6,898,189.

(51) Int. Cl.
   *G01R 31/08* (2006.01)
(52) U.S. Cl. .................... 370/219; 370/244; 714/11
(58) Field of Classification Search ........ 370/216–220, 370/242, 244; 714/2, 11, 12, 15; 711/62, 711/162; 379/9, 112.02, 221.03, 221.04, 379/279
See application file for complete search history.

(56) References Cited

U.S. PATENT DOCUMENTS

| | | | |
|---|---|---|---|
| 4,342,083 A | * | 7/1982 | Freedman et al. .......... 709/253 |
| 4,797,884 A | * | 1/1989 | Yalowitz et al. ............. 714/13 |
| 4,811,337 A | | 3/1989 | Hart |
| 4,922,486 A | | 5/1990 | Lidinksy et al. |

(Continued)

FOREIGN PATENT DOCUMENTS

EP  0 324 277 A2  7/1989

OTHER PUBLICATIONS

Horowitz, S., Dual-Layer Spanning Tree, A Spanning Tree Proposal for IEEE 802.1Q, May 14, 1997, pp. 45-48.

(Continued)

*Primary Examiner*—Chau Nguyen
*Assistant Examiner*—Ian N. Moore
(74) *Attorney, Agent, or Firm*—Cesari and McKenna LLP

(57) ABSTRACT

A method and apparatus allows for continued operation of one or more applications running at a network device with reduced delay despite crashes or failures at that device. The network device includes two or more supervisor cards for running the applications and a plurality of line cards. According to the invention, one supervisor card is designated the active supervisor card and one supervisor card is designated the standby supervisor card. As changes in state and other operating conditions take place on the active supervisor events are generating for passing at least some of this information to the standby supervisor where it is stored. Following a crash or failure of the active supervisor card, the standby becomes the newly active supervisor card. The standby supervisor performs a consistency check with the line cards and resets those that fail the check. The standby supervisor also determines which data records and state information stored at the standby supervisor are valid, and begins running the applications loaded onto the device. Those data records and state information determined by the standby supervisor to be valid are utilized by the applications in continuing their operation, while invalid data records and state information are discarded.

19 Claims, 16 Drawing Sheets

U.S. PATENT DOCUMENTS

| | | | |
|---|---|---|---|
| 5,018,137 A | 5/1991 | Backes et al. | |
| 5,072,440 A * | 12/1991 | Isono et al. | 370/220 |
| 5,138,615 A | 8/1992 | Lamport et al. | |
| 5,150,360 A | 9/1992 | Perlman et al. | |
| 5,265,092 A | 11/1993 | Soloway et al. | |
| 5,280,480 A | 1/1994 | Pitt et al. | |
| 5,309,437 A | 5/1994 | Perlman et al. | |
| 5,323,394 A | 6/1994 | Perlman | |
| 5,327,424 A | 7/1994 | Perlman | |
| 5,394,402 A | 2/1995 | Ross | |
| 5,398,242 A | 3/1995 | Perlman | |
| 5,400,333 A | 3/1995 | Perlman | |
| 5,473,771 A * | 12/1995 | Burd et al. | 714/4 |
| 5,511,168 A | 4/1996 | Perlman et al. | |
| 5,550,860 A | 8/1996 | Georgiou et al. | |
| 5,606,669 A | 2/1997 | Bertin et al. | |
| 5,684,800 A | 11/1997 | Dobbins et al. | |
| 5,734,824 A | 3/1998 | Choi | |
| 5,740,171 A | 4/1998 | Mazzola et al. | |
| 5,742,604 A | 4/1998 | Edsall et al. | |
| 5,752,003 A | 5/1998 | Hart | |
| 5,761,435 A | 6/1998 | Fukuda et al. | |
| 5,764,636 A | 6/1998 | Edsall | |
| 5,790,808 A | 8/1998 | Seaman | |
| 5,825,772 A | 10/1998 | Dobbins et al. | |
| 5,838,894 A * | 11/1998 | Horst | 714/11 |
| 5,841,967 A * | 11/1998 | Sample et al. | 714/33 |
| 5,844,902 A | 12/1998 | Perlman | |
| 5,870,386 A | 2/1999 | Perlman et al. | |
| 5,878,232 A | 3/1999 | Marimuthu | |
| 5,953,314 A * | 9/1999 | Ganmukhi et al. | 370/220 |
| 5,959,968 A | 9/1999 | Chin et al. | |
| 5,959,989 A | 9/1999 | Gleeson et al. | |
| 5,963,556 A | 10/1999 | Varghese et al. | |
| 6,005,841 A * | 12/1999 | Kicklighter | 370/217 |
| 6,032,194 A | 2/2000 | Gai et al. | |
| 6,035,105 A | 3/2000 | McCloghrie et al. | |
| 6,041,358 A | 3/2000 | Huang et al. | |
| 6,049,834 A | 4/2000 | Khabardar et al. | |
| 6,081,512 A | 6/2000 | Muller et al. | |
| 6,111,852 A * | 8/2000 | Leung et al. | 370/217 |
| 6,148,383 A * | 11/2000 | Micka et al. | 711/162 |
| 6,151,324 A | 11/2000 | Belser et al. | |
| 6,202,114 B1 | 3/2001 | Dutt et al. | |
| 6,236,659 B1 | 5/2001 | Pascoe | |
| 6,262,977 B1 | 7/2001 | Seaman et al. | |
| 6,298,061 B1 | 10/2001 | Chin et al. | |
| 6,330,229 B1 | 12/2001 | Jain et al. | |
| 6,351,452 B1 * | 2/2002 | Koenig et al. | 370/217 |
| 6,359,858 B1 * | 3/2002 | Smith et al. | 370/217 |
| 6,411,599 B1 * | 6/2002 | Blanc et al. | 370/219 |
| 6,438,707 B1 * | 8/2002 | Ronstrom | 714/13 |
| 6,445,715 B1 | 9/2002 | Annaamalai et al. | |
| 6,487,591 B1 * | 11/2002 | Budhraja et al. | 709/223 |
| 6,515,969 B1 * | 2/2003 | Smith | 370/256 |
| 6,535,490 B1 | 3/2003 | Jain | |
| 6,578,086 B1 * | 6/2003 | Regan et al. | 709/242 |
| 6,611,502 B1 | 8/2003 | Seaman | |
| 6,625,753 B1 * | 9/2003 | Skogman et al. | 714/13 |
| 6,628,624 B1 | 9/2003 | Mahajan et al. | |
| 6,628,661 B1 * | 9/2003 | Goldman et al. | 370/408 |
| 6,801,506 B1 | 10/2004 | Dey | |
| 6,898,189 B1 | 5/2005 | Di Benedetto et al. | |

OTHER PUBLICATIONS

Seaman, M. and Delaney, D., Single or Multiple Filtering Databases, May 8, 1997, pp. 1-8.

Lucent Technologies Inc.'s Initial Disclosure of Prior Art Under Civil Local Rule 16-7, Case No. C98-20836 JW (PVT) ENE.

IEEE Standard 802.1D, Draft Standard for Local Area Networks MAC (Media Access Control) Bridges: Technical and Editorial Corrections, Mar. 6, 1997, pp. 3-10.85-122 and 151-158.

Perlman, Radia, Interconnections: Bridges and Routers, (c) 1992, pp. 54-64.

Hart, John, Extending the IEEE 802.1 MAC Bridge Standard to Remote Bridges, IEEE Network, Jan. 1988, pp. 10-15, vol. 2, No. 1.

Bhandari, I, Ofek, Y, Bulent, Y., and Yung, M., Fault-Tolerant Convergance Routing, IEEE, 1994, pp. 229-238.

Perlman, R., An Algorithm for Distributed Computation of Spanning Tree in an Extended LAN, ACM ISSN 0146-4833, 1985, pp. 44-53.

Cheng, C., A Protocol to maintain a Minimum Spanning Tree in a Dynamic Topology, Cimet I.A; Kumar P.R., ACM 0-8979-279 9/88/088/0330, 1998, pp. 330-338.

Murakami, K. and Maruyama, M., A MAPOS version 1 Extension-Switch-Switch Protocol, Network Working Groug, RFC: 2174, Jun. 1997, pp. 1-23.

Seaman, M., A More Robust Tree: Active Topology Maintenance in Reconfiguring Bridged Local Area Networks (STP), 3Com Corp. Mar. 1996.

Seaman, Mick, High Availability Spanning Tree, Rev. 1.1, pp. 1-15.

Information technology-Telecommunications and information exchange between systems-Local area networks-Media access control (MAC) bridges, International Standard ISO/IEC 10038:1993 ANSI/IEEE Std 802.1D, (c) 1993, pp. Table of Contents, 43-67, 82-83.

Cisco Systems, Inc: Catalyst 5000 Series Release Notes for Software Release 2.1, Doc. No. 78-2896-02, 1996, pp. 1-12.

Cisco Systems, Inc: Release Notes for Catalyst 2820 Series and Catalyst 1900 Series Firmware Version 5.35, Doc. No. 78-3817-05, Aug. 1997, pp. 1-8.

Configuration and Monitoring Switch Node Software, Bay Networks, BCC Version 3.0, May 1997.

SK-NET Switch 6616 Ethernet/FDDI Switch Configuration Guide, SysKonnet Inc., Mar. 1995, pp. 1-42.

Part 3: Media Access Control (MAC) Bridges, ANSI/IEEE Std 802.1D, 1998 Edition, pp. 58-109.

Using Redundant Supervisor Engines, Oct. 1999 http://www.cisco.com/univered/cc/cat5000/rel_5_2/config/redund.htm.

Draft Standard P802.1Q/D10, "IEEE Standards for Local and Metropolitan Area Networks: Virtual Bridged Local Area Networks," Mar. 22, 1998.

* cited by examiner

| 502 EVENT TYPE | 504 PRODUCER | \multicolumn{6}{c}{506 REGISTERED LISTENERS} |
| | | 506a | 506b | 506c | 506d | 506e | 506f |
| | | A0 | A1 | A2 | A3 | A4 | An |
| E1 | A1,A2 | | | X | | | |
| E2 | A0 | | X | | | | |
| E3 | A4 | | X | | | | |
| E4 | A3,A4 | X | | | | | |
| E5 | A1 | | | | | | |
| E6 | A2 | | | X | X | | |
| E7 | A0 | X | X | X | | | |
| E8 | A2,A3 | | X | X | | | |
| ... | | | | | | | |

FIG. 5

HIGH AVAILABILITY ARCHITECTURE FOR NETWORK DEVICES

CROSS-REFERENCE TO RELATED APPLICATIONS

The present application is a continuation-in-part of commonly assigned U.S. patent application Ser. No. 09/644,377, now issued as U.S. Pat. No. 6,898,189, which was filed on Aug. 23, 2000, by Marco Di Benedetto, Ramana Mellacheruvu and Umesh Mahajan for a Restartable Spanning Tree for High Availability Network Systems and is hereby incorporated by reference.

BACKGROUND OF THE INVENTION

1. Field of the Invention

The present invention relates generally to computer networks, and more specifically, to a method and apparatus for quickly resuming the operation of selected applications and processes despite crashes and failures.

2. Background Information

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other network devices, commonly referred to as routers, may operate at higher communication layers, such as layer 3 of the OSI Reference Model, which in TCP/IP networks corresponds to the Internet Protocol (IP) layer. Data frames at the IP layer also include a header which contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks.

Bridges, switches and routers, like computers, typically have one or more processing elements and memory elements interconnected by a bus. They also include one or more line cards each defining a plurality of ports that couple the respective devices to each other, to the LANs and/or to end stations of the computer network. Ports that are used to couple two network devices together are generally referred to as a trunk ports, whereas ports used to couple a network device to a LAN or an end station(s) are generally referred to as access ports. The switching and bridging functions include receiving data from a sending entity at a source port and transferring that data to at least one destination port for forwarding to the receiving entity.

Switches and bridges typically learn which destination port to use in order to reach a particular entity by noting on which source port the last message originating from that entity was received. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

To perform their bridging, switching, and/or routing functions, network devices run a plurality of applications and/or protocols. In particular, a network device may run a protocol, such as the Dynamic Trunk Protocol (DTP), that causes its trunk ports to automatically negotiate with the trunks ports of the second network device to which it is coupled and decide upon a message encapsulation or tagging format in order to support Virtual Local Area Networks (VLANs). For example, the trunk ports may decide to encapsulate messages pursuant to the InterSwitch Link (ISL) protocol from Cisco Systems, Inc. of San Jose, Calif. or the 802.1Q standard from the Institute of Electrical and Electronics Engineers (IEEE).

Network devices may also run the Port Aggregation Protocol (PAgP) from Cisco Systems, Inc. to identify and aggregate redundant trunk and access ports, i.e., two or more trunks that couple the same two network devices or two or more access ports that coupled a device to the same LAN or end station, so as to permit load balancing, among other advantages. In particular, PAgP, which relies on packets exchanged between neighboring devices or with itself, groups redundant ports or links into a single, logical channel.

Many network devices also run a protocol or algorithm to detect and eliminate circuitous paths or loops within the corresponding computer network. In particular, most computer networks are either partially or fully meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

To avoid the formation of loops, most bridges and switches execute a spanning tree algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the IEEE spanning tree protocol, bridges elect a single bridge within the bridged network to be the "root" bridge, and each bridge selects one port (its "root port") which gives the lowest cost path to the root. In addition, for each LAN coupled to more than one bridge, only one (the "designated bridge") is elected to forward frames to and from the respective LAN. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. To obtain the information necessary to run the spanning tree protocol, network devices exchange special messages called configuration bridge protocol data unit (BPDU) messages.

To facilitate the management of VLANs, a network device may run the VLAN Trunk Protocol (VTP) from Cisco Systems, Inc. VTP is a Layer 2 messaging protocol that maintains VLAN configuration consistency by managing the addition, deletion, and renaming of VLANs across the network. With VTP, a network administrator can make VLAN configuration changes at a single network device and have those changes propagated to most if not all of the network devices in the corresponding computer network or domain.

U.S. Pat. No. 6,049,834 to Khabardar, et al describes a Layer 3 Unicast Shortcut Protocol that may be run by a network device. This protocol allows routers to download shortcut decisions to switches so that they can make certain layer 3 routing decisions.

These applications and protocols typically execute on a supervisor card disposed within the network device and/or on one or more line cards or modules disposed within the network device. To carry out their various functions, these applications or protocols transition among a plurality of states and save configuration and state information in one or more data structures. If the supervisor card crashes or fails, the network device is generally rendered inoperative and must be re-started or replaced. This may result in significant disruption to the network including a potential loss of connectivity for one or more entities.

To provide redundancy, some network devices include a second supervisor card. As described in *Using Redundant Supervisor Engines* from Cisco Systems, Inc., the Catalyst 5500 and 6000 series of network devices from Cisco Systems, Inc. include two supervisor cards. Each of these cards, moreover, includes a network management processor (NMP) and memory resources, among other components, for running these applications and protocols. One of the supervisor cards is designated the active card while the other is designated the standby card. If a crash or failure occurs on the active supervisor card, the standby card takes over and begins running the applications and protocols. Each application and protocol, however, must be started from its initialization state on the back-up supervisor card. That is, each application and protocol begins as if the network device were just powered-up.

For example, the PAgP protocol begins transmitting packets to see whether the network device has any redundant trunk or access ports that can be aggregated into a single, logical channel. This occurs even though the PAgP protocol, as it ran on the failed supervisor card, may have previously identified several redundant links or ports and aggregated them into corresponding channels. The STP protocol similarly re-starts its computations for each port of the network device. That is, the STP protocol running on the back-up card transitions all ports to the blocking or listening states and begins transmitting BPDU messages assuming it is the root.

This process of re-starting all of the applications and protocols from an initialization state following a failure or crash at the active supervisor card can delay the forwarding of messages by the network device for a significant amount of time. In particular, it may take on the order of 30 seconds or more for the device to begin forwarding messages again. Such delays can seriously affect performance of the network. Indeed, such delays can be catastrophic for audio, video and other types of network traffic that cannot accommodate delays in transmission.

Furthermore, short duration failures or crashes of a supervisor card is not an infrequent problem. Failures or crashes can occur due to power fluctuations, glitches in the running of one or more applications or protocols, hardware faults, etc. Accordingly, significant time is often lost re-starting applications and protocols following a failure or crash of the active supervisor card, even though no change in network topology has occurred and the device, including its ports, may ultimately be returned to their original states.

SUMMARY OF THE INVENTION

Briefly, the invention relates to a method and apparatus for continuing the operation of one or more applications, protocols or processes running at a network device with reduced delay despite crashes or failures at that device. The network device includes a plurality of line cards having ports for receiving and forwarding network messages, and two or more supervisor cards for processing at least some of those messages. According to the invention, one supervisor card is designated the active supervisor card and one supervisor card is designated the standby supervisor card. Applications loaded onto the device are run by the active supervisor card and/or the line cards. Disposed on the network device are a series of cooperating facilities for sharing certain application related information, such as data records and state information, with the standby supervisor card which stores that information.

Following a crash or failure of the active supervisor card, the standby becomes the newly active supervisor card, and begins running the applications, protocols and processes loaded onto the device. The standby supervisor also determines which data records and state information stored at the standby supervisor are valid. In particular, the standby determines which events are complete and which remain unfinished. The standby supervisor also queries the line cards to determine which of their state and other information is consistent with the corresponding information stored at the standby supervisor. Data records and state information that are determined by the standby supervisor card to be valid are utilized by the applications in resuming their operation, while invalid data records and state information are discarded. The applications resume operation on the standby supervisor utilizing the state and data record information that was determined to be valid, thereby avoiding significant disruption.

BRIEF DESCRIPTION OF THE DRAWINGS

The invention description below refers to the accompanying drawings, of which:

FIGS. 5 and 8 are highly schematic block diagrams of preferred data structures utilized by the present invention.

DETAILED DESCRIPTION OF AN ILLUSTRATIVE EMBODIMENT

Figure 1:
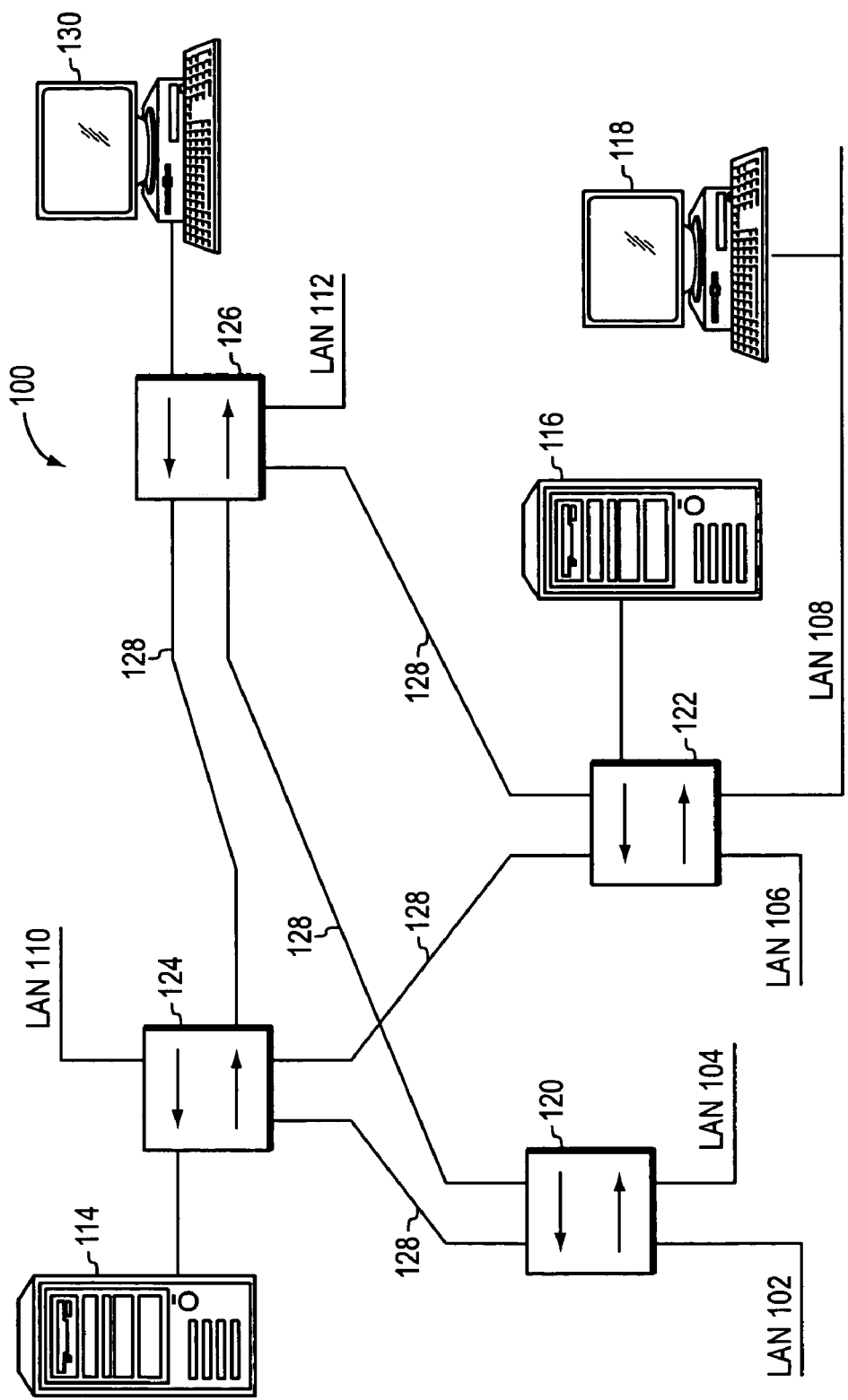
FIG. 1 is a highly schematic diagram of a computer network in accordance with the present invention.

FIG. 1 illustrates a computer network 100, which may be a bridged network. The network 100 preferably comprises a plurality of local area networks (LANs) 102–112 and servers 114, 116, such as file servers, print servers, etc. Attached to the LANs 102–112 are one or more hosts or end stations, such as end station 118 coupled to LAN 108, which may source or sink data frames over the network 100. LANs 102–112 and servers 114, 116 are preferably interconnected through one or more intermediate network devices, such as switches 120–126. An end station, such as end station 130, may also be connected directly to a switch, such as switch 126. Switches 120–126, in turn, are interconnected through a series of links 128, such as point-to-point links or trunks. More specifically, each switch 120–126 includes a plurality of ports that are coupled to corresponding LANs, servers, end stations and trunk links, and each port, such as the ports at switch 126, may be identified by a corresponding port number (e.g., port 1, port 2, port 3, etc.) Switches 120–126 are thus able to associate their specific ports with the LANs, switches, servers, etc. that are coupled thereto or otherwise accessible through a given port.

It should be understood that the bridged network 100 of FIG. 1 is meant for illustrative purposes only and that the present invention will operate with other network designs having possibly far more complex topologies.

Figure 2:
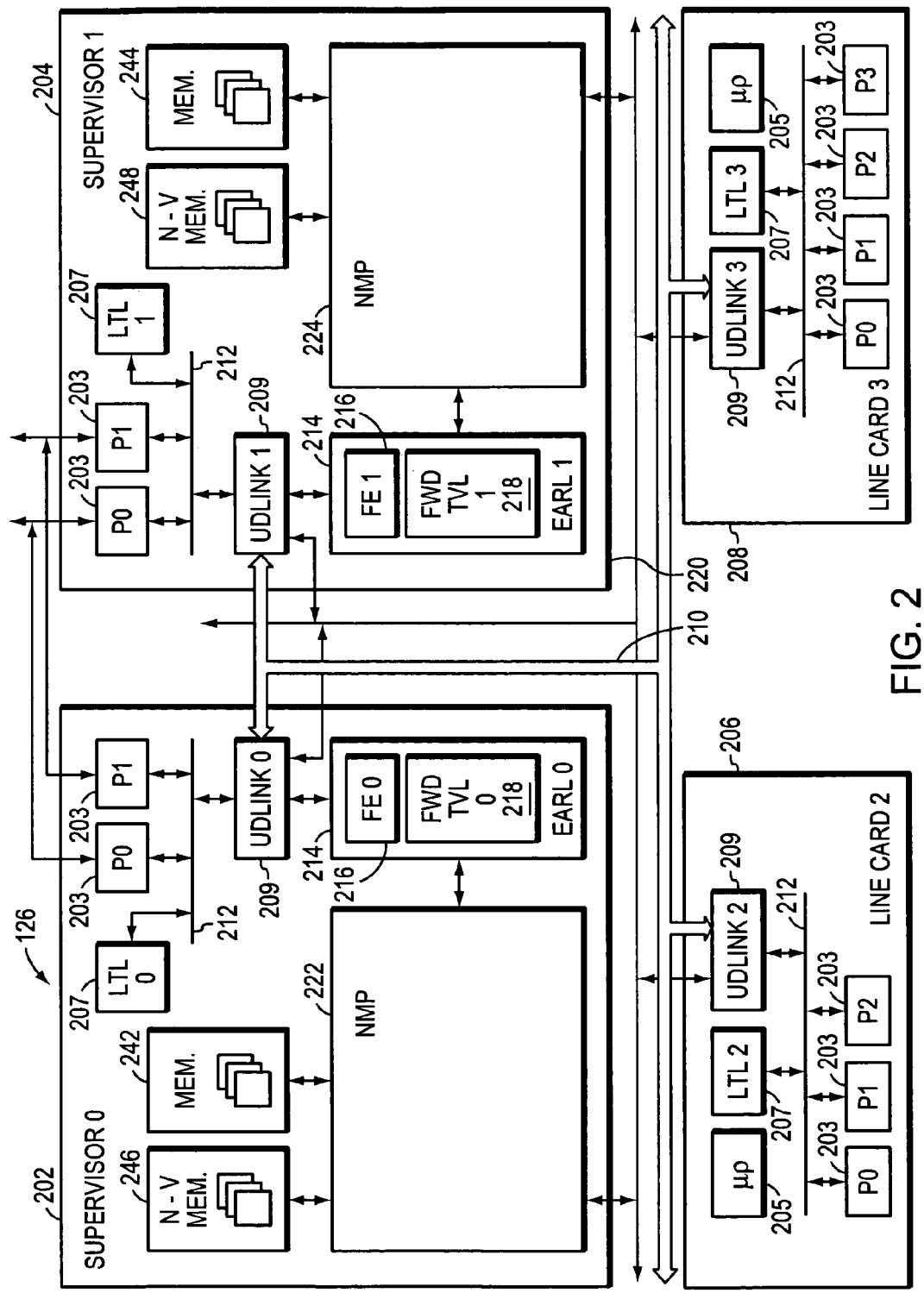
FIG. 2 is a partial block diagram of an intermediate network device in accordance with a preferred embodiment of the present invention.

FIG. 2 is a partial block diagram of switch 126 in accordance with the present invention. Switch 126 preferably includes a plurality of supervisor cards 202 and 204 (e.g., supervisor cards 0 and 1), and a plurality of line cards or modules 206 and 208 (e.g., line cards 2 and 3). Supervisor cards 202 and 204 and line cards 206 and 208 are interconnected by a high speed message bus 210. Each line card 206 and 208 comprises a plurality of ports P (e.g., P0–P2) 203, a microprocessor (μp) 205, a local target logic (LTL) memory 207 and an up/down link (UDLINK) 209, which operates as an interface circuit. The microprocessors 205 may be configured to run or participate in running of one or more applications, protocols or processes. The ports 203 of each line card 206 and 208, are interconnected with each other and with the respective UDLINK 209 by a local bus 212 that is disposed on the respective line card 206 and 208.

The supervisor cards 202 and 204 may similarly include their own ports 203, LTL memory 207, UDLINK 209 and local bus 212.

In order to render forwarding decisions that can be implemented by the switch 126, each supervisor card 202, 204 preferably includes an encoded address recognition logic (EARL) circuit 214 coupled to its UDLINK 209. The EARL circuit 214 executes all forwarding decisions between the ports 203 of the line cards 206 and 208 and the supervisor cards 202 and 204. To that end, each EARL circuit 214 contains a forwarding engine (FE) 216 and at least one forwarding table (FWD TBL) 218 configured to produce a unique destination port index value. The LTL memories 207 implement "local" forwarding decisions, i.e., forward decisions among the ports 203 of the same line card or supervisor card.

High speed message bus 210 is preferably a switching matrix employed to control the transfer of data among the various cards 202, 204, 206 and 208 plugged into the switch 126. The UDLINK 209 of each card basically interfaces between the local bus 212 at the respective card and the message bus 210. Inputs to the various LTL memories 207 may be received over the respective local buses 212, which are driven by the corresponding UDLINKs 209. Switch 126 also includes a common bus 220 that similarly interconnects the line cards 206 and 208 and the supervisor cards 202 and 204 to support additional message handling.

Each supervisor card 202 and 204 further includes a network management processor (NMP) 222 and 224 that may be configured to run or participate in the running of a plurality of applications, protocols or processes implemented at and/or loaded onto switch 126. Each supervisor 202 and 204 also includes both a run-time memory 242 and 244, such as a random access memory (RAM), and a non-volatile memory 246 and 248, such as a non-volatile RAM (NVRAM). The NMPs 222 and 224 are in communicating relationship with the corresponding memories 230 and 234 and 232 and 236, in order to store and retrieve information therefrom. Each NMP 222 and 224 is also coupled to high-speed bus 210, e.g., via the UDLINKs 209, and common bus 220 so that information may be exchanged between and among the NMPs 222 and 224 and the line cards 206 and 208.

As indicated above, the NMPs 222 and 224 and the microprocessors 205 can run a plurality of applications, protocols and processes to facilitate the performance of switch 126. More specifically, the NMPs 222 and 224 may be configured to run the spanning tree protocol (STP), the VLAN Trunk Protocol (VTP), the Unicast Shortcut Protocol, a multicast shortcut protocol, the Port Aggregation Protocol (PAgP) and the Dynamic Trunk Protocol (DTP), among others. The microprocessors 205 at line cards 206 and 208 either alone or in cooperation with the NMPs 222 and 224 may be configured to run other applications, protocols and processes which may be in the form of firmware.

Suitable intermediate network device platforms for use with the present invention include but are not limited to the commercially available Catalyst 5000 and 6000 series of switches from Cisco Systems, Inc. of San Jose, Calif.

Figure 3:
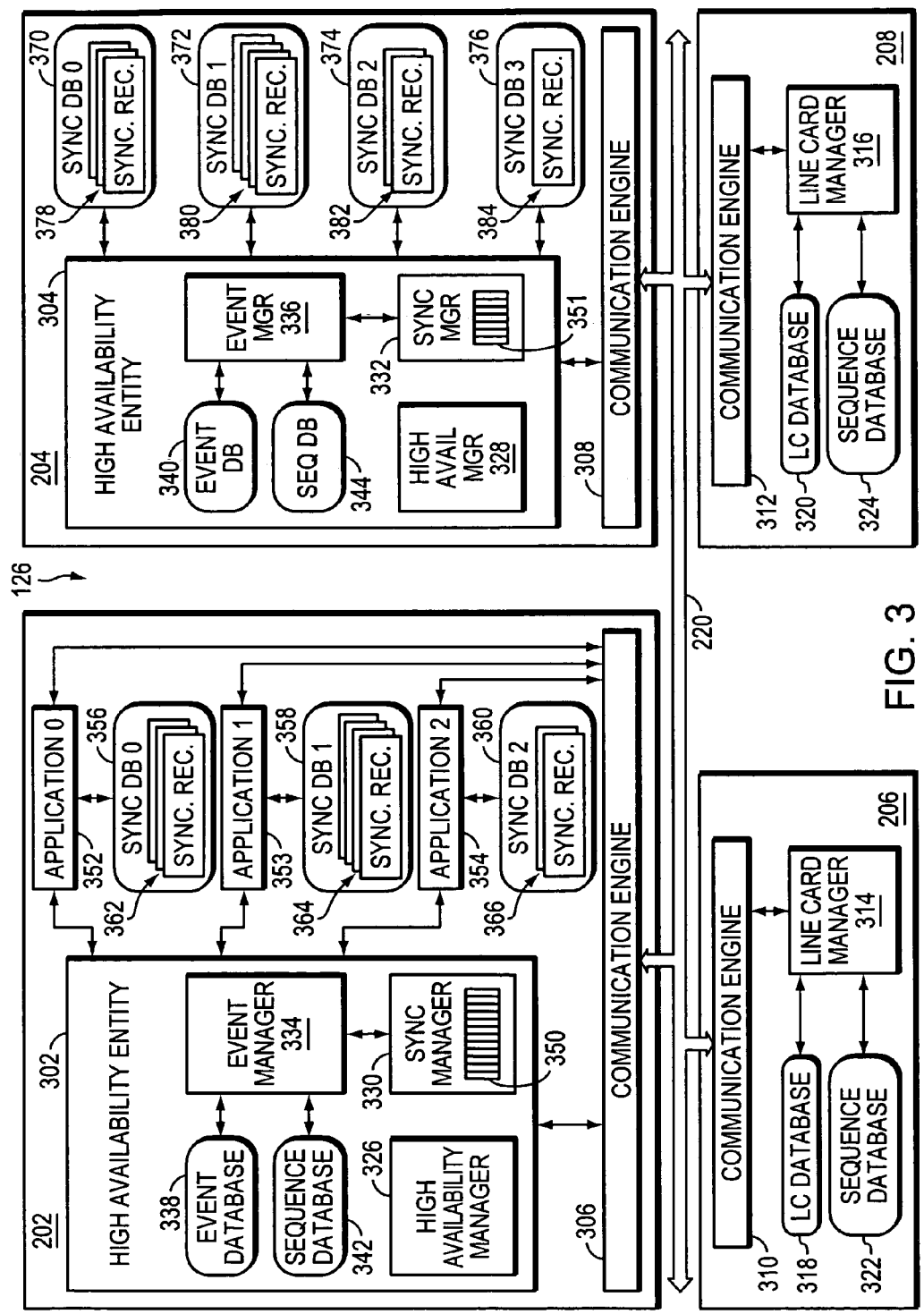
FIG. 3 is a highly schematic, functional block diagram of the intermediate network device of FIG. 2.

FIG. 3 is a highly schematic, functional block diagram of switch 126. In accordance with the present invention, a high availability entity 302 and 304 is loaded onto and implemented at each supervisor card 202 and 204. Also running on each supervisor 202 and 204 is a communication engine 306 and 308. Running on each line card 206 and 208 are a communication engine 310 and 312 and a line card manager 314 and 316, which are in communicating relationship with each other. The line card managers 314 and 316 also have access to a line card (LC) database 318 and 320 and a sequence database 322 and 324. The communications engines 306, 308, 310 and 312 at each card, moreover, are each in communicating relationship with bus 220 so that messages may be exchanged among the various cards 202, 204, 206 and 208 of switch 126.

Each high availability entity 302 and 304 includes a plurality of facilities that allow applications, protocols and processes running on switch 126 to continue operation despite crashes or failures. In the illustrative embodiment, an event-based communication architecture is used to pass information from one supervisor to the other. An event is basically a message containing information about a change, such as a change in state, that took place somewhere on the switch 126. In accordance with the invention, there are three basic types of events:

"protocol events", which are produced by an application, protocol or process running at switch 126 in response to a change in its operating state or condition;

"system events", which are caused in response to some un-commanded network change, such as a port or link going from a down condition to an up condition or vice versa; and "external events", which are caused in response to some intentional network change, such as a network administrator executing a command at a Command Line Interface (CLI) terminal or screen or automatically by the well-known Simple Network Management Protocol (SNMP).

To implement this event-based architecture, each high availability entity 302 and 304 includes a high availability manager 326 and 328, a synchronization (sync) manager 330 and 332, an event manager 334 and 336, an event database 338 and 340 and a sequence database 342 and 344. Each high availability entity 302 and 304, moreover, is coupled to the respective communication engine 306 and 308. The synch managers 330 and 332 include a synchronization queue (SYNC_Q) 350 and 351. As described below, the SYNC_Qs 350 and 351 are used to sequentially buffer messages that are to be transmitted between the supervisors 202 and 204.

The high availability managers 326 and 328, the sync managers 330 and 332 and the event managers 334 and 336 may each comprise programmed or programmable program instructions or processing elements, such as software programs, modules or libraries, pertaining to the methods described herein that are executable by the respective NMPs or by other processors, processing elements or integrated circuits. These program instructions may be stored at one or more memories, such as memories 242, 244, 246 and/or 248, or at other computer readable media in order to store and/or transmit the program instructions. The high availability managers 326 and 328, the sync managers 330 and 332 and the event managers 334 and 336 may also be implemented in hardware through a plurality of registers and combinational logic configured to produce sequential logic circuits and cooperating state machines. Those skilled in the art will also recognize that various combinations of hardware and software components may also be utilized to implement the present invention.

FIGS. 4, 7 and 10–12 are flow diagrams of the preferred methods for achieving the high availability objects of the present invention. Prior to its activation, switch 126 is preferably configured with default information which may be used to run one or more applications, protocols and processes, such as the spanning tree protocol. For example, a network administrator, working either locally or remotely from switch 226, in addition to loading executable instructions for running the spanning tree protocol, may set various spanning tree parameters, e.g., bridge priority, root path costs, hello time, maximum age time, forward delay time, etc., and this configuration information may be stored at the switch's non-volatile memories 246 and 248. The network administrator may similarly load executable instructions and may set configuration parameters in order to run other applications or protocols at switch 126.

Figure 4A:
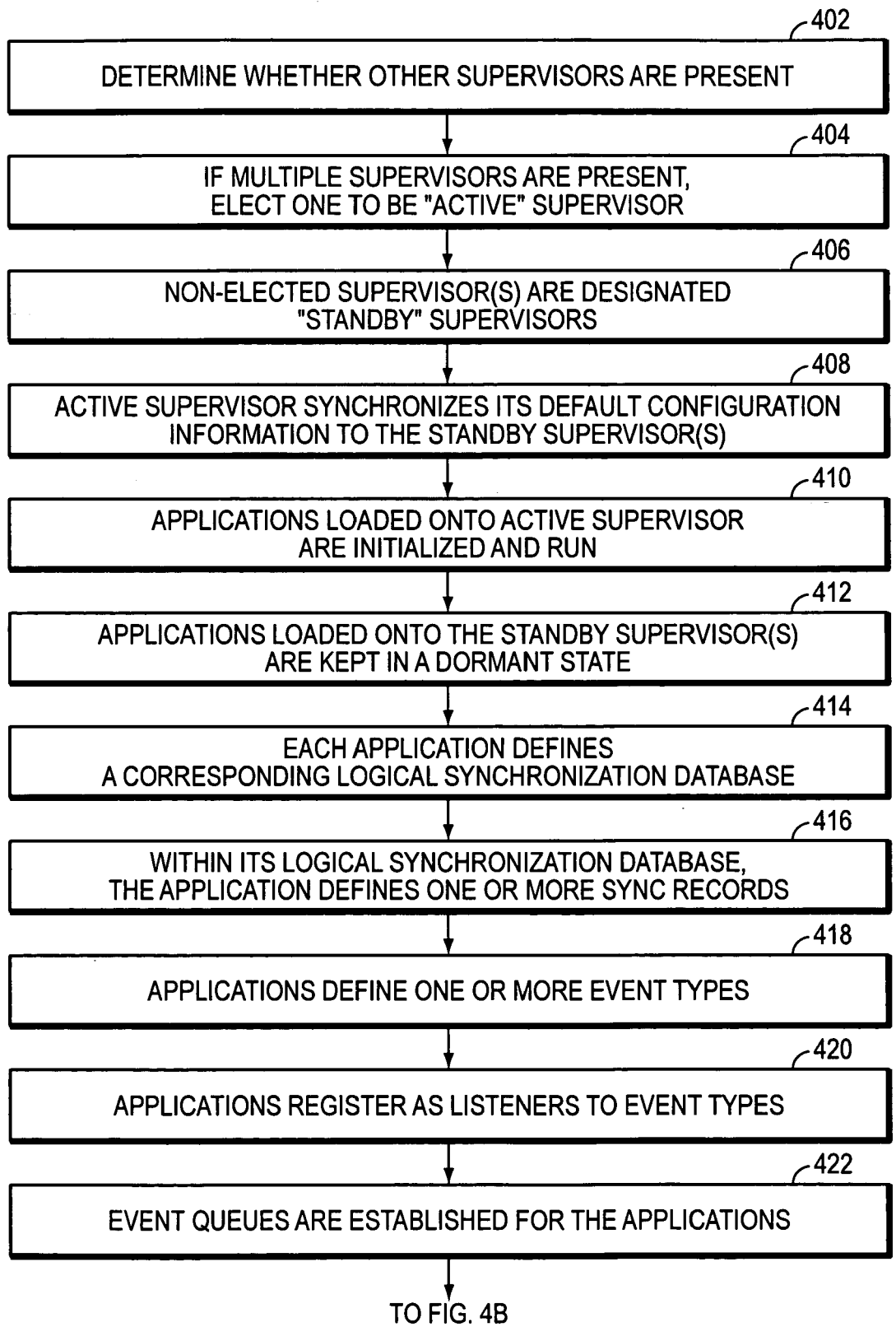
FIGS. 4, 7 and 10–12 are flow diagrams of the methods of the present invention.

When a supervisor, e.g., supervisor 202, is initialized or starts running, it first determines whether there are any other supervisors in the switch 126, as indicated at block 402 (FIG. 4A). If so, the two (or more) supervisors 202 and 204 elect or designate one of them to be the "active supervisor", as indicated at block 404. The supervisors 202 and 204 may employ any suitable criteria for use in electing one of them to be the active supervisor, such as electing the supervisor card that is inserted into the lowest (or highest) slot number in the switch's chassis. Each supervisor 202 and 204, moreover, may include some mechanism, such as an elector circuit (not shown), to perform the designation. Suppose, for example, that supervisor 202 is elected to be the active supervisor. All or at least one of the other supervisor cards at switch 126, i.e., supervisor 204, are then designated "standby supervisors", as indicated at block 406. Upon being designated the active supervisor, the high availability entity 302 at the active supervisor 202 preferably synchronizes its default configuration information to the standby supervisor(s), as indicated at block 408. For example, with regard to STP configuration information, the active supervisor 202 sends a copy of the spanning tree parameter values from its non-volatile memory 246 to standby supervisor 204. The standby supervisor 204 utilizes this information to update the contents of its non-volatile memory 248, thereby making them consistent with the information at the active supervisor 202.

Next, the applications, processes and protocols loaded onto the active supervisor 202, which may hereafter simply be referred to as applications, are initialized and run, as indicated at block 410. More specifically, applications 352, 353 and 354 may be initialized and run on the active supervisor card 202. Exemplary applications or protocols represented by blocks 352, 353 and 354 may include STP, VTP and the Unicast Shortcut Protocol, respectively. Other exemplary applications or protocols include DTP and PAgP. DTP is described in copending, commonly owned U.S. patent application Ser. No. 09/141,231, filed Aug. 27, 1998, and is hereby incorporated by reference in its entirety. PAgP is described in commonly owned U.S. patent application Ser. No. 08/902,638, filed Jun. 30, 1997, now U.S. Pat. No. 5,959,968, and is hereby incorporated by reference in its entirety.

The applications loaded onto the standby supervisor 204 are not initialized or run, as indicated at block 412. Instead, the applications at the standby supervisor 204 are kept in a dormant or sleeping mode.

One or more applications, processes or protocols may also be run on the line cards 206 and 208 by the respective line card managers 314 and 316. These line card-level applications may access the LC databases 318 and 320 in order to store and retrieve information and/or data used by the line card-level applications.

Those skilled in the art will recognize that additional and/or other applications, processes or protocols may be running on switch 126 and that they may or may not take advantage of the high availability objects of the present invention.

Those applications, e.g. applications 352, 353 and 354, at the active supervisor 202 that wish to take advantage of the high availability functions provided by switch 126 then perform several steps. Specifically, each such application 352, 353 and 354 defines a logical synchronization database 356, 358 and 360, as indicated at block 414. Within its logical synchronization database 356, 358 and 360, the application then defines one or more synchronization records, which may generally be referred to by reference numbers 362, 364 and 366, as indicated at block 416. Synchronization records 362, 364 and 366 contain the data or information that the application wishes to have synchronized to its counterpart application on the standby supervisor 204. Specifically, the application developer identifies that data or information which is to be used by the counterpart application on the standby supervisor 204 in order to continue operation of the application following a crash or failure of the active supervisor 202. The logical synchronization databases 356, 358 and 360 will typically model the state of the respective applications 352, 353 and 354.

The synchronization databases 356, 358 and 360 are "logical" in that they are not a duplicate copy of the information maintained by the application, but preferably a designation that certain of the application's information, as stored in a portion of run-time memory allocated to the application, represents its logical synchronization database. This conserves the switch's memory resources. In the preferred embodiment, logical synchronization databases 356, 358 and 360 contain only a subset of the entire set of data or information associated with the respective applications so as to conserve processing and communications resources at the switch 126.

For example, although the STP defines state variables for the identity of the root bridge, the identity of designated bridge(s), the identity of designated ports and the spanning tree port state of each port, among other things, it preferably only defines a sync record for the spanning tree port state for each port 230 of switch 126. As a result, the identity of the root bridge and the designated bridge(s), among other things, are not synchronized to the standby supervisor 202. PAgP preferably defines synchronization records for the PAgP state of each port 230, among other information. DTP preferably defines synchronization records for the operational status and operational type of trunk ports and for the negotiation status of trunk ports, among other information.

As described below, although the applications are not running on the standby supervisor 204 (i.e., they remain in a sleeping mode), synchronization databases 370, 372, 374 and 376 having sync records 378, 380, 382 and 384, similar to their counterparts on the active supervisor 202, are established and maintained on the standby 204 as well.

Next, each application 352, 353 and 354 defines or creates one or more event types that the application will use to synchronize data to the standby supervisor 204, as indicated at block 418. The application also specifies the attributes for each defined event type. For each event type that is defined, the application also specifies whether a sequence number should be generated for instances of that event type, as described below. As a general rule, if an instance of a given event type will result in some action being taken at one or more of the line cards 206 and 208, then the application preferably requests that a sequence number be generated for instances of this event type.

The STP application 352, for example, may define a PORT_CHANGE_STATE event type for use in notifying the standby supervisor 204 that a particular port on a particular line card has changed its spanning tree port state. The PORT_CHANGE_STATE event type may include as its attributes the line card and port number identifying the port whose state is being changed, the VLAN designation associated with the change, if relevant, and the new port state. It may also request a sequence number. The VTP application 353 may define a MOVE_PORT_TO_VLAN event type whose attributes may include the line card and port number of a port whose VLAN designation is being changed. Additional attributes may include the old VLAN designation and the new VLAN designation. Another application, such as a link/module up/down application or process, may define an ADD_DELETE_PORT event type for use in notifying the standby 204 whenever a port is added to or deleted from the switch 126. Attributes for this event type may include the line card and port number of the port, the VLAN designation of the port and a flag signifying whether the port is being added or deleted. The PAgP and DTP applications may each define NEGOTIATION events for use in notifying the standby 204 when a port begins negotiating with a neighboring device. One of them may also define an ADD_TO_STP event for use when a given port(s) is ready to be considered by the STP application 352.

The applications 352, 353 and 354 running at the active supervisor 202 may also register with the event manager 334 in order to listen to or be notified of the occurrence of specific instances of event types, as indicated at block 420. An application, for example, may wish to be notified of the events that it produces and/or one or more events that are produced by other applications running at the active supervisor 202. The STP application 352, for example, may wish to know whenever a port is added to or deleted from the switch 126 or whenever a port changes its VLAN association. Accordingly, the STP application 352 registers with the event manager 334 so as to be notified of the occurrence of any ADD_DELETE_PORT and MOVE_PORT_TO_VLAN events. As the applications 352, 353 and 354 define event types and/or register as listeners for existing event types, the event manager 334 may establish an event queue (not shown) for each application 352, 353 and 354 and may assign each queue a unique identifier, i.e., an event queue identifier (EQID), as indicated at block 422. Alternatively, the EQIDs may be statically defined.

In order to register as a listener for an event type, applications 352, 353 and 354 preferably use the system or task calls defined by an Application Programming Interface (API) layer that is implemented by the event manager 334 on the active supervisor 302. The available API system calls may include the following:

eventRegister( ) and
eventDeregister( ), which are used to register for and deregister from events, and newEvent( ) and
eventComplete( ), which are used to initiate and finish events, as described below.

Figure 4B:
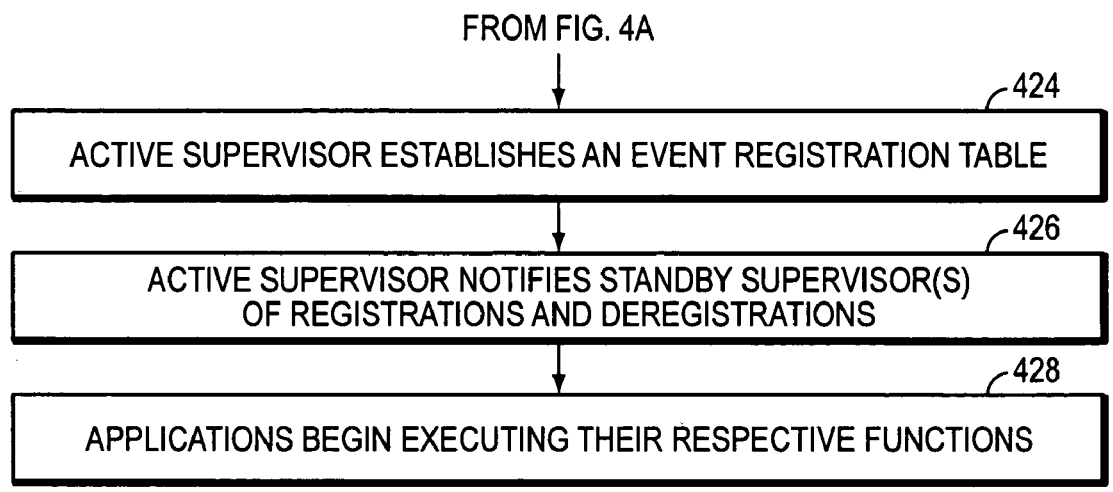

The arguments of the eventRegister( ) API call include the event type and the listening application's EQID. As each event type is defined and applications register as listeners of the various event types, the event manager 334 at the active supervisor 202 builds and fills in an event registration table at its event database 338, as indicated at block 424 (FIG. 4B).

FIG. 5 is a highly schematic representation of a preferred event registration table 500. Event registration table 500 is preferably logically arranged as an array having a plurality of columns and rows whose intersections define corresponding cells or records for storing data. The table 500 has a first column 502 whose cells or records contain the event types defined by the applications 352, 353 and 354 running on the active supervisor 202, as described above, which may be identified by the abbreviations, E1, E2, E3, etc. Table 500 further includes a second column 504 whose records or cells contain an identifier of the application(s) that may produce instances or occurrences of the corresponding event types of column 502. A third column 506 identifies the application(s) that have registered as listeners to the event types of column 502. Third column 506 may consist of a plurality of sub-columns 506*a–f*, one or each application. When a particular application registers to listen to a specified event type by issuing an eventRegister( ) API, the event manager 334 responds by designating the corresponding sub-column 506*a–f* for that event type. For example, the event manager 334 may assert or deassert, e.g., place an "X" in, the respective cell or record. Application "A0", for example, has registered to listen to event types "E4" and "E7", application "A1" has registered to listen to event types "E2", "E3", "E7" and "E8", and so on. Applications may alternatively be identified within columns 504 and 506 by their EQIDs. In addition to the event registration table 500, the event manager 334 also creates a pending events table, as indicated at block 426. The pending events table is described in more detail below.

Each application that defines an event type or registers to listen for a particular event type must also define or provide to the high availability entity 302 a function, which may be termed an "event_recovery_func( )", that may be called should the active supervisor 202 fail before an instance of that event type is completed by the respective producer or listener application. Possible event_recovery_func( )s include "reset" or "redo" operations, but preferably not "undo" operations. In the illustrative embodiment, the event_recovery_func( )s and EQID for each application are statically defined at each supervisor 202 and 204.

If an application wishes to stop receiving instances of a specific event type, it preferably issues the eventDeregister( ) API call to the event manager 334. The arguments of this API call include event type and listener's EQID. In response, the event manager 334 clears the corresponding cell or record of the respective sub-column 506*a–f* associated with the deregistering application from the event registration table 500 for that event type.

The active supervisor 202 may also notify the standby supervisor 304 of eventRegister( ) and eventDeregister( ) APIs, as indicated at block 426 (FIG. 4B). More specifically, in response to receiving an eventRegister( ) API, the event manager 334 on the active supervisor 202 generates a REGISTER_NOTIFY message that contains the event type for which registration is being requested, an identifier of the application registering for the event type and the application's EQID. The REGISTER_NOTIFY message is then passed by the event manager 334 to the synch manager 330 which places it in the SYNC_Q 350. Similarly, in response to an eventDeregister( ) API, the event manager 334 creates a DEREGISTER_NOTIFY message, which is placed in the SYNC_Q 350. As messages reach or near the head of the SYNC_Q 350, they are preferably encapsulated within a packet or frame and transmitted to the standby supervisor 204 via communication engine 306 and bus 220.

Figure 6:
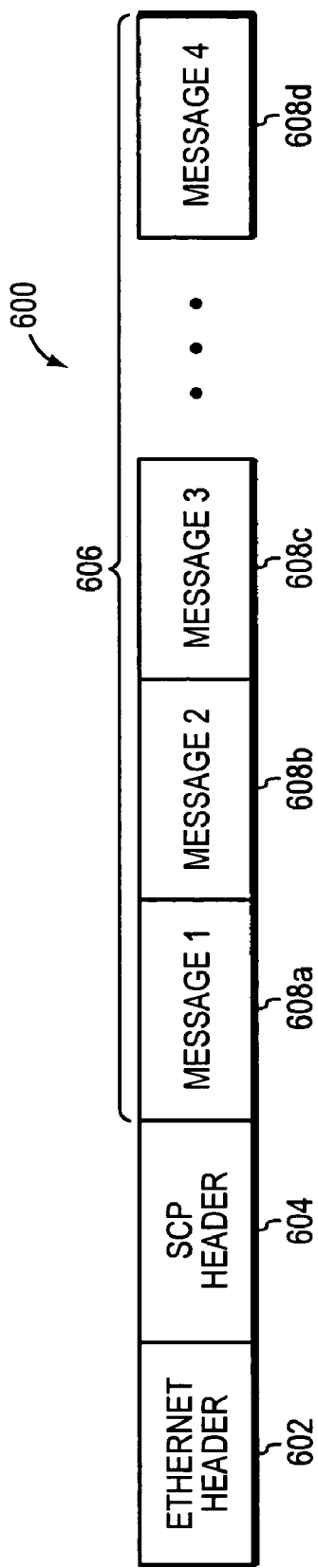
FIGS. 6 and 9 are highly schematic block diagrams of preferred message formats utilized by the present invention.

FIG. 6 is a highly schematic block diagram illustrating the format of a preferred packet or frame 600 traversing bus 220. Bus 220 preferably operates in accordance with the well-known Ethernet data communication standard. Accordingly, frame 600 includes an Ethernet header portion 602 having Destination Address (DA) and Destination Service Access Point (DSAP) fields (not shown), among others. Frame 600 further includes a header 604 corresponding to another data communication layer, such as a Serial Communication Protocol (SCP), that defines and includes one or more operation code (opcode) fields for specifying the type or class of information that is being carried in the frame 600. The SCP header 604 may also define and include one or more command fields for specifying specific actions that are to be carried out on the contents of the frame 600. Following the SCP header 604 is a data portion 606. Data portion 606 may include one or more messages 608*a–d*, such as a REGISTER_NOTIFY and/or a DEREGISTER_NOTIFY messages, among others, from the SYNC_Q 350. The order of messages 608*a–d* within data the portion 606 of a given SCP frame 600 preferably corresponds to the order of the messages 608*a–d* in the SYNC_Q 350. That is, the message, e.g., message 608*a*, at the head of the SYNC_Q 350 is the first message in the data portion 606 and so on. The number of messages 608*a–d* that can be loaded into data portion 606 depends on their size as constrained by the maximum size of Ethernet frames.

SCP frame 600 is received at the synch manager 332 of the standby supervisor 204 and may be placed at least temporarily in its SYNC_Q 351. The high availability entity 304 at the standby supervisor 204 uses the contents of REGISTER_NOTIFY and/or DEREGISTER_NOTIFY messages from received SCP frames 600 to update its event database with the applications registered for particular events. Should the standby supervisor 204 become the active supervisor, as described below, it will use this information to monitor and track events.

After registering for event types of interest, defining corresponding event_recovery_func( )s, and configuring their logical synchronization databases 356, 358 and 360, the applications 352, 353 and 354 at the active supervisor 204 begin performing their respective functions, as indicated at block 428. As part of their operation, applications 352, 353 and 354 may modify or change one or more of the state variables or other conditional information maintained by them. As indicated above, such changes are considered to be protocol events which are acted upon by the high availability entities 302 and 304 at supervisors 202 and 204.

Processing of Protocol Events

Figure 7A:
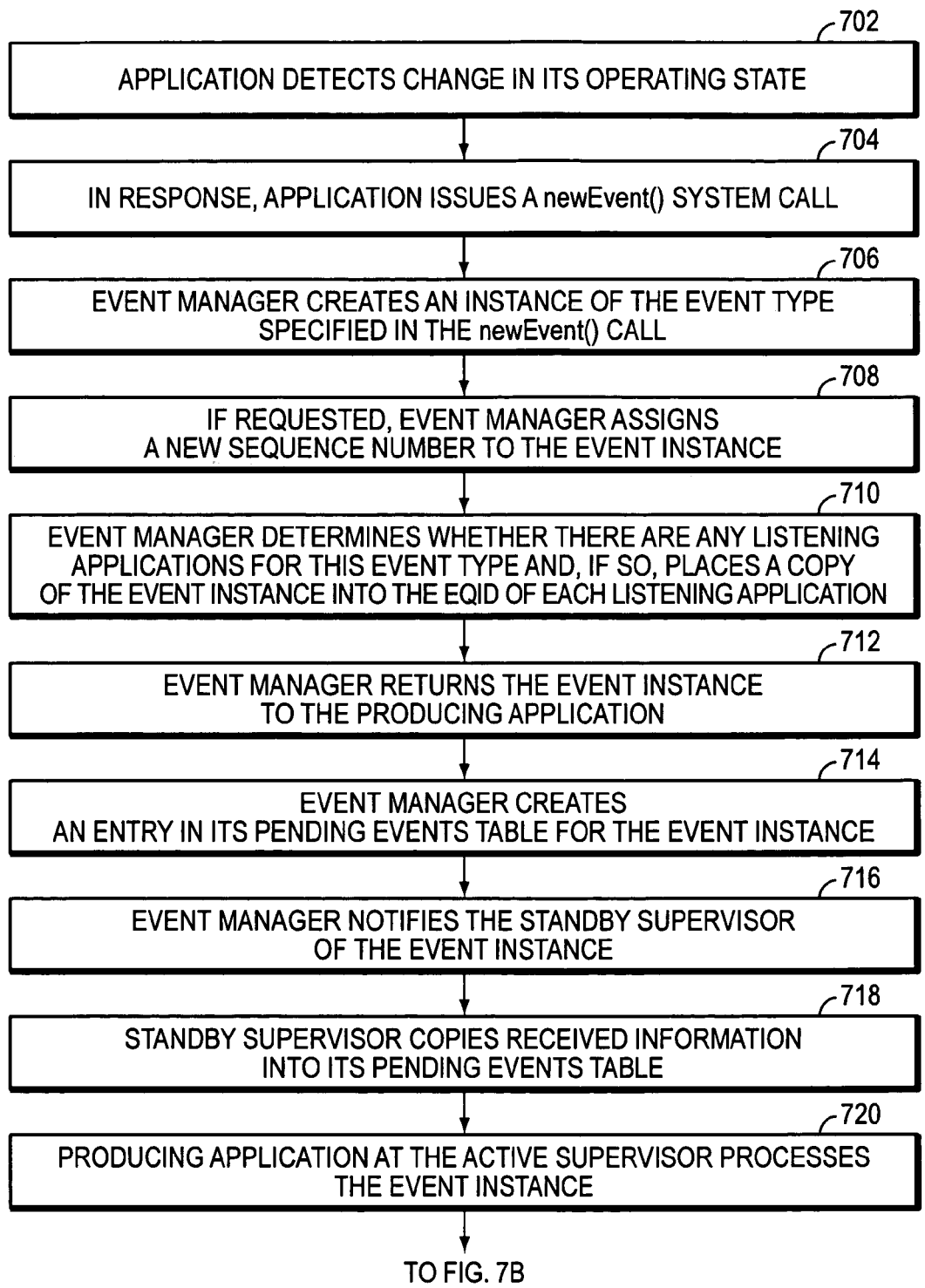

FIG. 7 is a flow diagram of the preferred steps of the present invention in response to a change in the operating state or condition of an application running on the active supervisor 202, i.e., a protocol event. Suppose, for example, that the STP application 352 running at the active supervisor 202 detects some change in its operating state such as a port changing spanning tree state, as indicated at block 702 (FIG. 7A). As part of its response to this change, application 352 is programmed or otherwise configured to issue a newEvent( ) API call to the event manager 334, as indicated at block 704. The arguments of the newEvent( ) API include the event type, the producer's EQID, the event data, if any, and the size of the data. In response to the newEvent( ) API call, the event manager 334 creates an instance of the event type specified in the API call, which may be referred to herein as an event instance or simply an event, as indicated at block 706. The event manager 334 also assigns an identifier, e.g., an eventID, to the event instance. If a sequence number has been requested for events of this event type, the event manager 334 also assigns a unique sequence number to the event, as indicated at block 708.

To generate a sequence number, the event manager 334 preferably accesses the sequence database 342 and retrieves the next available sequence number. The sequence database 342 may be implemented as counter that can be operated, e.g., incremented or decremented, by the event manager 334 in order to obtain a new sequence number. The event manager 334 then performs a look-up of event registration table 500 to determine which other applications, if any, have registered as listeners for events of this type, as indicated at block 710. Suppose, for example, that the event type is E1 and that it was produced by application A1, e.g., the STP application 352. In this case, the event manager 334 determines that application A2, e.g., the VTP application 353, has registered for events of type E1. Accordingly, the event manager 334 also places a copy of the event instance, including the eventID, the sequence number, if any, and the data into the EQID for application A2, as also indicated at block 710. The event manager 334 next returns a copy of the event instance, including the eventID, the sequence number, if any, and the specified data to the producing application, as indicated at block 712.

It should be understood that the producing application could also have requested that a copy of the event be placed in its EQID. The producing application may also omit its EQID from the newEvent( ) API call.

Next, the event manager 334 creates an entry for the event in its pending events table that is preferably maintained in the event database 338, as indicated at block 714. As described herein, the pending events table is used to keep track of which event instances have yet to be completed by all of the interested applications.

Figure 8:
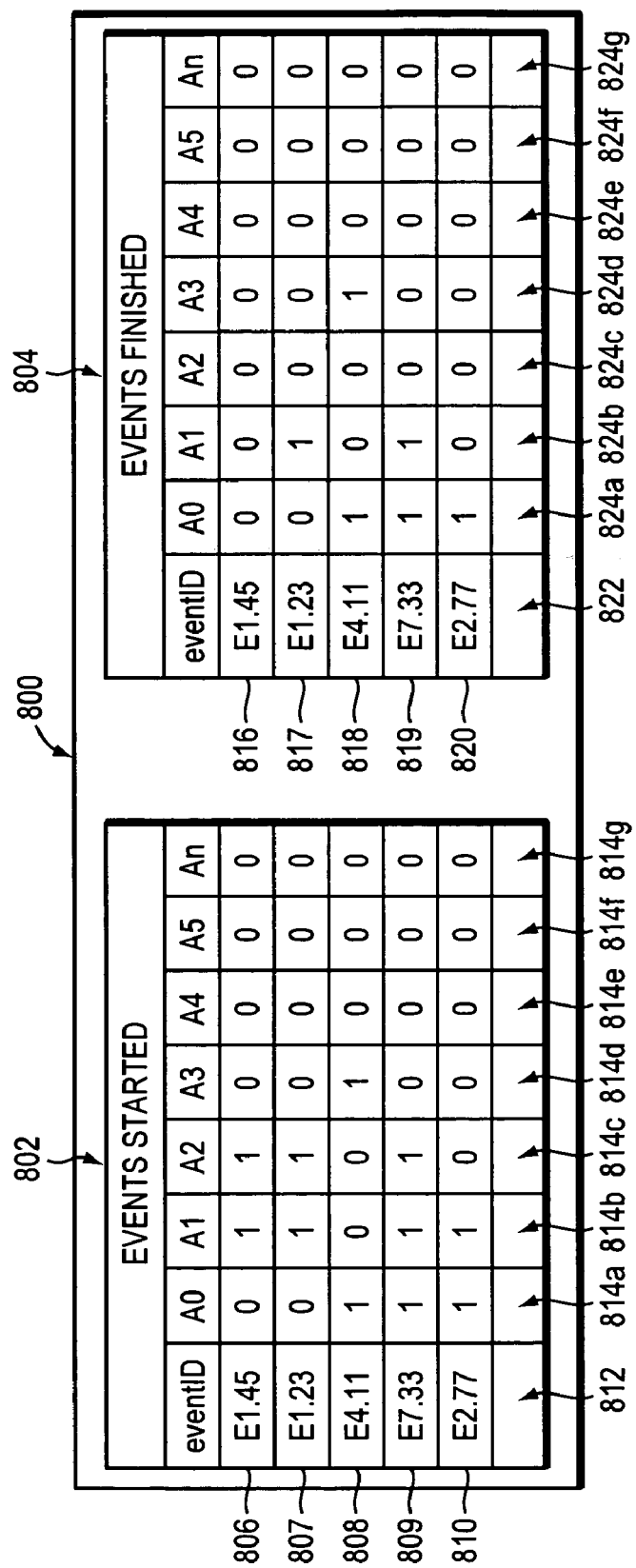

FIG. 8 is a highly schematic, block diagram of a pending events table 800. In the illustrative embodiment, table 800 comprises a first table element 802 and a second table element 804 each of which is made up of a series of bit maps or bit strings. First table element 802 identifies those event instances that have been started and specifies the producing application and listening applications, if any, for each event instance. Second table element 804 identifies which applications have completed their processing of each pending event instance. As indicated above, first table element 802 is made up of a sequence of individual bit maps 806–810 each one corresponding to a different event instance. Each of the individual bit maps 806–810 includes an eventID cell 812 that specifies the identifier that has been assigned to the respective event instance, e.g., "E1.45", "E1.23", "E4.11", etc. Each individual bit map 806–810 further includes a corresponding cell 814a–g for each application running on the active supervisor 202, e.g., applications A0–An, that may use the high availability facilities or objects of the present invention. Second table element 804 is also made up of a sequence of individual bit maps 816–820 each one corresponding to a different event instance. Each of the individual bit maps 816–820 includes an eventID cell 822 and a corresponding cell 824a–g for each application.

When a new event instance is created, the event manager 334 preferably creates a corresponding bit map, e.g., bit maps 810 and 820, within the first and second table elements 802 and 804. In the eventID cell of these two bit maps 810 and 820, the event manager 334 loads the eventID assigned to this event. The event manager 334 then sets, e.g., asserts, those application cells 814a–g and 824a–g for the application(s) that will be processing the event and are thus expected to notify the event manager 334 when their processing of the event is complete. Specifically, the event manager 334 asserts, e.g., sets to "1", the application cells, e.g., cells 814a, 814b, 824a and 824b, that correspond to the producing application and to the listening application(s), if any, and de-asserts, e.g., sets to "0", all other application cells for the given event instance. The event manager 334 may refer to the information in its event registration table 500 in order to assert/de-assert the application cells 814a–g and 824a–g of the respective bit maps 810 and 820.

As described below, as individual applications notify the event manager 334 that they have completed their processing of an event, the event manager de-asserts the application cell for that application from the respective bit map of the second table element 804. Thus, by comparing, e.g., applying one or more Boolean operations to, the bit maps from the first and second table elements 802 and 804 that correspond to the same event instance (as indicated by the eventIDs), the event manager 334 can determine which applications have yet to complete their processing of the event instance.

Those skilled in the art will understand that other arrangements can be used to store the information of table 800.

In addition to returning the event instance to the producing application, placing copies of the event into the EQIDs of the listening applications and updating its pending events table 800, the event manager 334 notifies the standby supervisor of the occurrence of the event, as indicated at block 716. In particular, the event manager 334 generates an EVENT_BEGIN message. The EVENT_BEGIN message contains the event type, the bit map generated for the first table element 802 for the event (which includes the event's eventID and designates the producing and listing applications, if any), the sequence number, if any, and the data specified by the producing application. The event manager 334 passes the EVENT_BEGIN message to the sync manager 330, which, in turn, places it in the SYNC_Q 350. When the EVENT_BEGIN message reaches (or nears) the head of the SYNC_Q 350, it is encapsulated within an SCP frame 600 and transmitted to the standby supervisor 204 via communication engine 306 and bus 220 in a similar manner as described above. At the standby supervisor 204, the EVENT_BEGIN message is received by the sync manager 332. The event manager 336 at the standby supervisor 204 stores the sequence number, if any, from the EVENT_BEGIN message in its sequence database 344, and copies the bit map into the first and second table elements 802 and 804 of its pending events table 800, as indicated at block 718.

Returning to the active supervisor 202, upon receiving the event instance that was returned to it by the event manager 334, the producing application, i.e., application 352 or A1, processes the event, as indicated at block 720. That is, the application takes the appropriate, i.e.; programmed, action in response to the event. Suppose this action includes commanding a line card, e.g., line card 206, to take some action, such as changing some state or condition associated with one or more of its ports, e.g., port P1. Suppose this action further includes modifying the contents of one or more of the application's sync records 362 so as to store this new state or condition. If so, the application 352 preferably generates an SCP command message for transmission to the line card 206. The SCP command message preferably identifies the affected port and the new state or condition to which the port should be transitioned. The command message further includes the sequence number that was generated by the event manager 334 and returned to the application 352 with the copy of the event instance. The application 352 passes the SCP command message to communication engine 306, which sends it to line card 206 via bus 220. The SCP command message from the application 352 is preferably not placed in or routed through the SYNC_Q 350.

Figure 7B:
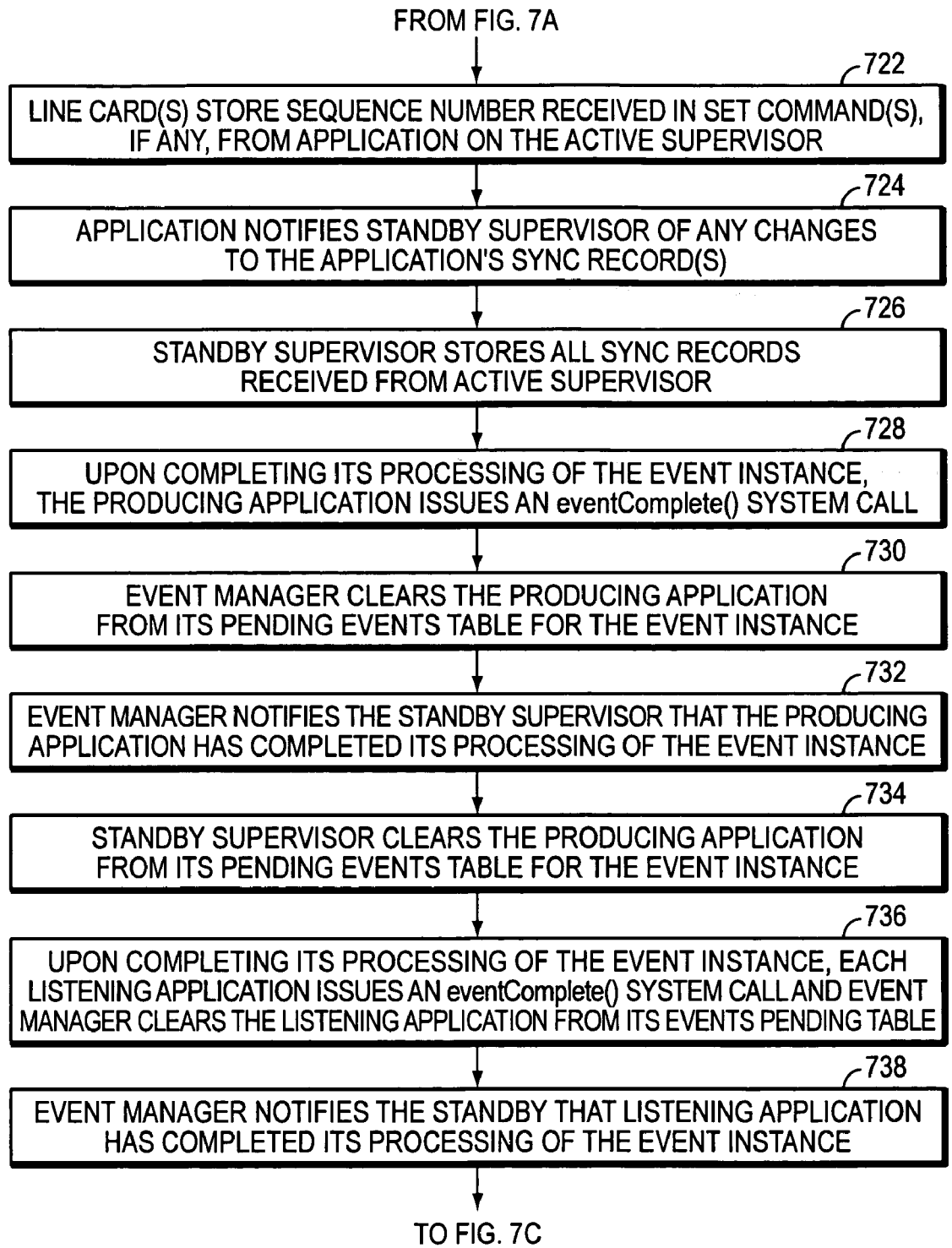

The SCP command message is received by the line card's communication engine 310, which provides it to the line card manager 314. Manager 314 takes the corresponding action, e.g., changing the state or condition of port P1. The line card manager 314 also stores the sequence number from the command message at its sequence database 322, as indicated at block 722 (FIG. 7B). The line card manager 314 may or may not return an acknowledgment message to the application 352 at the active supervisor 202.

In accordance with the preferred embodiment of the present invention, the line card managers 314 and 316 only store at their respective sequence databases 322 and 324 the single, highest sequence number they have received. To the extent the line card manager 314 was storing a previous sequence number at the time it received the SCP command message containing the new sequence number, the previous, e.g., lower, sequence number is discarded and only the sequence number that was just received is saved by the line card manager 314. If a received sequence number happens to be lower than the currently stored sequence number, the line card manager 314 carries out the action of the SCP message, but retains the higher sequence number. In other words, the line card manager 314 and 316 at each line card 206 and 208 only stores the highest sequence number that it has received.

Since it is modifying or changing, e.g., writing to, the contents of one or more of its sync records 362, the application 352 also causes the standby supervisor 204 to be informed of the new value(s) for each modified synch record 362, as indicated at block 724. In particular, the application 352 creates a SYNC_RECORD_MESSAGE for transmission to the standby supervisor 204.

Figure 9:
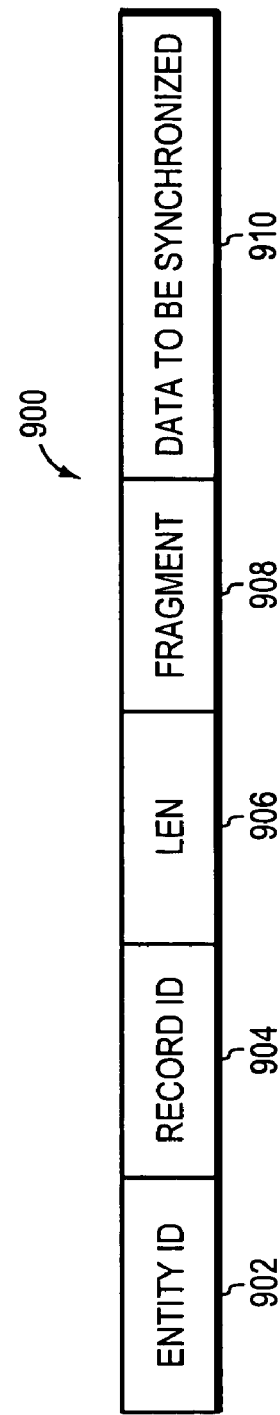

FIG. 9 is a highly schematic block diagram of a preferred SYNC_RECORD_MESSAGE 900. Message 900 has a plurality of fields including an entity identifier (ID) field 902, a record ID field 904, a length (len) field 906, a fragment field 908 and a data field 910 that contains the particular data, e.g., the sync record 362, that is to be synchronized to the standby supervisor 204. In the entity ID field 902, the application 352 preferably loads a unique identifier that has been assigned to it. In the record ID field 904, the application 352 preferably loads a value, such as memory address, that identifies which record of its synchronization database 356 has been modified. The application 352 may use the length field 906 to specify the length of data field 910. Within data field 910, the application 352 loads the new value for the sync record specified within field 904. The application 352 may use a get function, which may be termed "record_sync_func( )", in order to pack the data to be loaded into field 910 into a known format for the standby supervisor 204.

Once it has created the SYNC_RECORD_MESSAGE, the application 352 preferably causes it to be sent to the standby supervisor 204. In particular, the application 352 calls a transmit function, which may be referred to as the "ha_tx_sync( ) function". The ha_tx_sync( ) function takes the SYNC_RECORD_MESSAGE 900 and places it in the SYNC_Q 350 at the active supervisor 202. When the message 900 reaches or nears the head of the SYNC_Q 350, it is encapsulated in an SCP frame 600 and transmitted to the standby supervisor 204 in a similar manner as described above.

The SCP frame 600 is received at standby's communication 308 and is passed to the high availability entity 304, based on the message's Destination Address (DA) and/or Destination Service Access Point (DSAP). The sync manager 332 preferably recovers the SYNC_RECORD_MESSAGE 900 from the SCP message 600. The sync manager 332 then uses the entity ID and the record ID from fields 802 and 804 of the sync record 900 to index a database and derive a put function, which may also be the record_sync_func( ) described above.

Specifically, the sync manager 332 may be statically configured with the particular record_sync_func( )s corresponding to each possible entity ID and record ID pair. On the standby 204, execution of the record_sync_func( ), causes the data in the data portion 810 of the sync record 900 to be recovered. It also causes the recovered data to be stored at the specified sync record 378 at the logical synchronization database 370 for the application 352, as indicated at block 726. In particular, the record_sync_func( ) uses the values from the entity and record ID fields 802 and 804 to locate the correct synchronization database 370 and synchronization record 378. The record_sync_func( ) then writes the unpacked data of field 810 to that record.

Upon completing all of its programmed action(s), e.g., issuing the SCP set command message to line card 206, updating its own sync record 362 and transmitting the new sync record to the standby supervisor 204, the application 352 preferably issues an eventComplete( ) API call to the event manager 334, as indicated at block 728. The arguments of the eventComplete( ) API call include the event's eventID and an identifier of the application issuing the eventComplete( ) API call, e.g., its EQID. In response to the eventComplete( ) API call, the event manager 334 modifies its pending events table 800 to reflect that application 352 has completed its processing of the subject event, as indicated at block 730. In particular, the event manager 334 accesses the particular bit map, e.g., bit map 820, from second table element 804 that corresponds to the event instance specified by the eventID of the eventComplete( ) API call. The event manager 334 then de-asserts the application cell, e.g., cell 824b, that corresponds to the EQID from the eventComplete( ) API call so as reflect that the event manager 334 is no longer waiting for application A1 to complete this event.

The event manager 334 also notifies the standby supervisor 204 that application 352 has completed its processing of this event, as indicated by block 732. In particular, the event manager 334 creates an EVENT_COMPLETE message for use in notifying the standby supervisor 204. The EVENT_COMPLETE message includes the bit map, i.e., bit map 820, from second table element 802 that it has modified. The EVENT_COMPLETE message is provided to the sync manager 330 which places it in the SYNC_Q 350 for transmission to the standby supervisor 204. The EVENT_COMPLETE message is received at the standby's communication engine 308 which passes the message to the high availability entity 304. The event manager 336 then updates its pending events table 800 to reflect that application A1 has completed its processing of the event, as indicated at block 734. In particular, the event manager 336 uses the eventID to identify the corresponding bit map, i.e., bit map 820, from the standby's second table element 804 and replaces that bit map with the modified bit map that was received in the EVENT_COMPLETE message from the active supervisor 202, i.e., the bit map 820 having application cell 824b de-asserted.

Figure 7C:
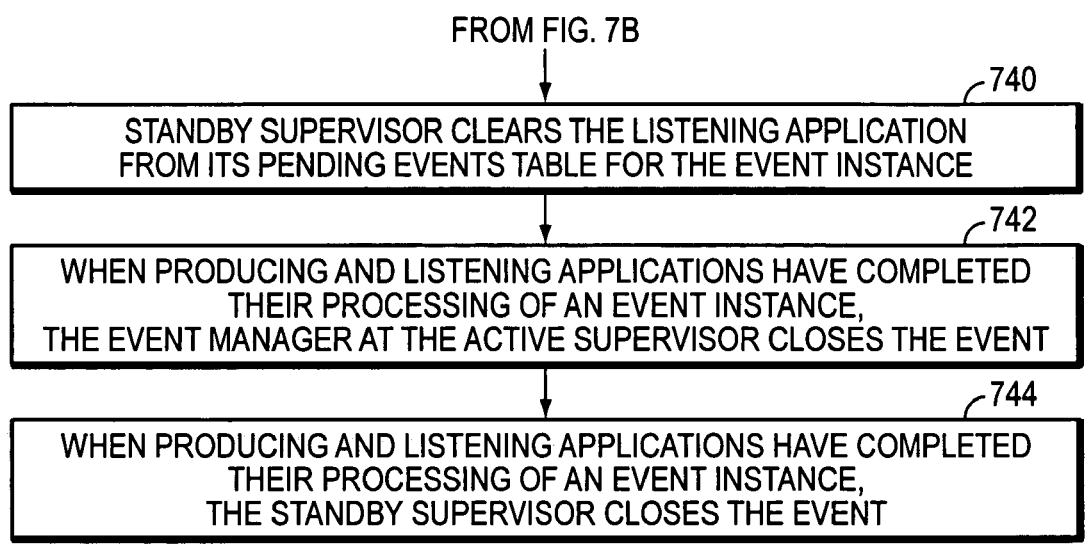

Other applications that received a copy of the event instance in their EQIDs similarly perform their programmed processing of the event. These applications may similarly update one or more of their sync records in response to the event and, if so, issue sync record messages to the standby supervisor 204. These applications may also issue one or more events in response to the first event. As a result, events may become nested within each other. As each of these other applications complete their processing of the first event, they similarly issue an eventComplete( ) API call to the event manager 334, which de-asserts the respective application cells from bit map 820, as indicated at block 736. The event manager 334 then sends an EVENT_COMPLETE message with a copy of the modified bit map 820 to the standby supervisor 204, as indicated at block 738, and the standby supervisor 204 clears the respective application from its pending events table, as indicated at block 740 (FIG. 7C).

When the producing application and all listening applications of a particular event have issued eventComplete( ) API calls, the event manager 334 preferably closes the corresponding event, as indicated at block 742. In particular, the event manager 334 removes the bit map that was established for this event from both the first and second table elements 802 and 804 of its pending events table 800. The event manager 336 at the standby supervisor 204 similarly closes events that have been processed by the producing and all listening applications, as indicated at block 744.

Processing of System Events

Figure 10:
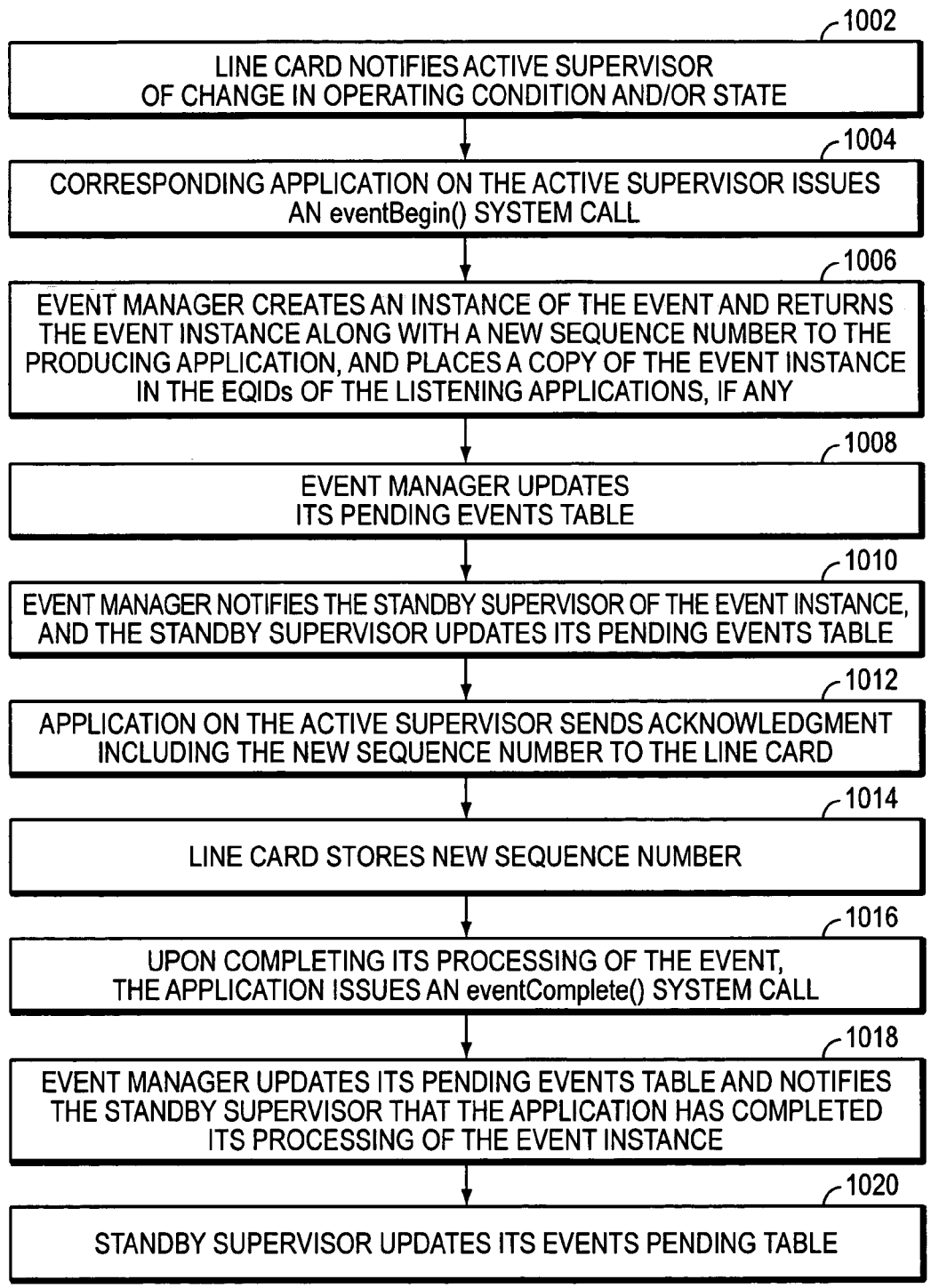

FIG. 10 is a flow diagram of the preferred steps of the present invention in response to a system generated event. Suppose, for example, that a link up condition is detected at port P3 of line card 208. That is, a new link is installed at port P3. In response to this system event, the line card manager 316 generates an unsolicited SCP message, which may generally have the format of frame 600 (with or without the Ethernet header), for transmission to the active supervisor 202 to notify it of this new condition, as indicated at block 1002. The unsolicited SCP message is transmitted by communication engine 310 to the active supervisor 202 via bus 220 where it may be provided to the link/module up/down application. The link/module up/down application preferably issues an newEvent( ) API call to the event manager 334 for a LINK_UP event type, as indicated at block 1004, that it previously defined in a similar manner as described above.

In response, the event manager 334 preferably creates an instance of this event and returns it along with a new sequence number, which it obtains from the sequence database 342, to the link/module up/down application, as indicated at block 1006. It also places the event in the EQIDs for any applications that registered as listeners to this event type, as also indicated by block 1006. The event manager 334 also updates its pending events table 800, as indicated at block 1008, by creating a new bit map in each of the first and second table elements 802 and 804. The event manager 334 also generates an EVENT_BEGIN message containing the sequence number and the new bit map, among other information, and sends this message to the standby supervisor 204 via the SYNC_Q 350, as indicated at block 1010. The standby supervisor 204 updates its pending events table, as also indicated at block 1010.

The link/module up/down application preferably generates an SCP acknowledgement message to line card 208 containing the sequence number generated by the event manager 334, as indicated at block 1012. The acknowledgement is sent to the line card 208 via communication engine 306 and bus 200. The acknowledgement preferably does not get placed in the SYNC_Q 350. When the acknowledgment is received at line card 208, the line card manager 316 updates its sequence database 324 with the new sequence number, as indicated at 1014. The line card manager 316 preferably does not consider the link to be in an up condition until the acknowledgement from the link/module is up/down application on the supervisor 202 is received. To the extent a sync record of the link/module up/down application is modified, the application generates a SYNC_RECORD_MESSAGE with the new sync record and sends it to the standby supervisor 204 via the SYNC_Q 350.

When the link/module up/down application completes its processing of the event, it issues an eventComplete( ) API call to the event manager 334, as indicated at block 1016. The event manager 334 modifies its pending events table 800 by updating the corresponding event finished bit map established for this event, generates an EVENT_COMPLETE message containing the new bit map and sends the EVENT_COMPLETE message to the standby supervisor 204 via the SYNC_Q 350, as indicated at block 1018. The event manager 336 at the standby supervisor 204, in turn, updates its pending events table, as indicated at block 1020.

To the extent other applications registered as listeners for this type of event, they process the event and issue eventComplete( ) API calls to the event manager 334. The event manager 334 updates the corresponding bit map in its pending events table 800 accordingly and sends EVENT_COMPLETE messages to the standby supervisor 204 containing the update.

Processing of External Events

Figure 11A:
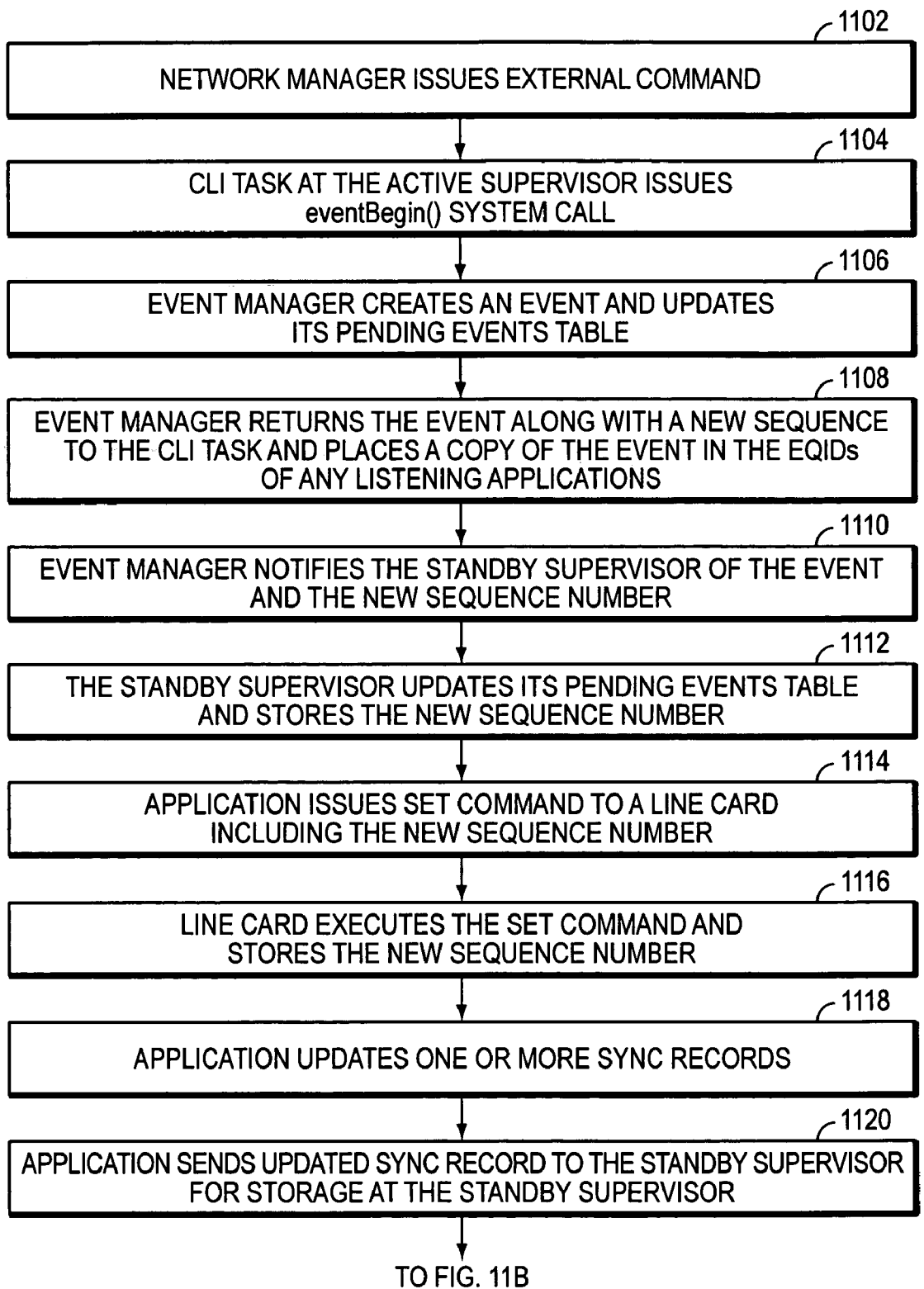
Figure 11B:
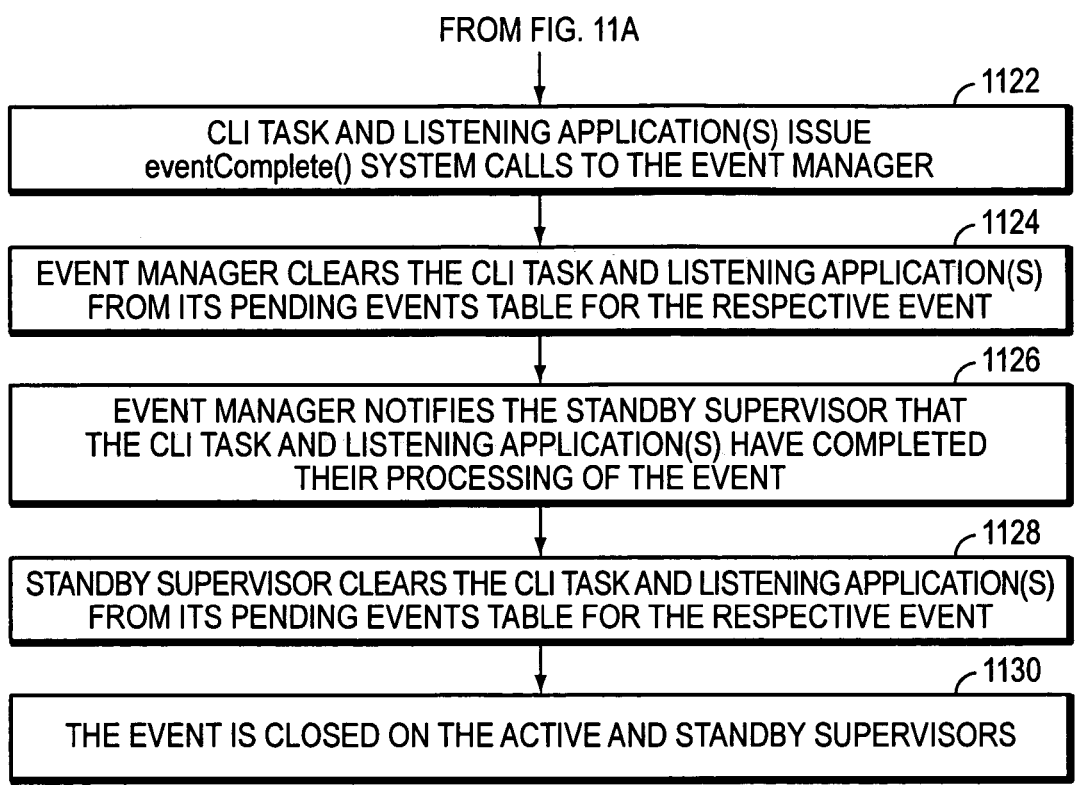

FIG. 11 is a flow diagram of the preferred steps of the present invention in response to an externally generated (relative to switch 126) event. Suppose, for example, that a network administrator working at a network management console issues a command line interface (CLI) command for updating some information at switch 126, as indicated at block 1102 (FIG. 11A). Suppose further that application 354, in response to the update, needs to direct one or more ports of line card 206 to change state. In response to the command, a CLI task or manager (not shown) operating on the active supervisor 202 first updates the corresponding information. The CLI task then issues an newEvent( ) API call to the event manager 334, as indicated at block 1104, for an event type that it previously defined. Since a change will be made at a line card, the event type includes a request for a sequence number. The event manager 334, in turn, generates an instance of the corresponding event and updates its pending events table 800 by creating a pair of new bit maps, as indicated at block 1106. The event manager 334 also obtains a new sequence number for the event.

The event manager 334 returns a copy of the event, including the new sequence number, to the CLI task and places a copy of the event in the EQID for application 354, as indicated at block 1108. The event manager 334 also issues an EVENT_BEGIN message that includes the new sequence number to the standby supervisor 204, as indicated at block 1110. The standby supervisor 204 adds the new bit map from the EVENT_BEGIN message to its pending events table 800 and stores the new sequence number, as indicated at block 1112. The application 354 meanwhile, if required as part of its processing of the event, issues a SCP set command, which includes the sequence number, to line card 206 directing it to take the corresponding action, as indicated at block 1114. Line card 206 executes the corresponding action and stores the new sequence number at its sequence database 322, as indicated at block 1116. The application 354 may then modify one or more of its sync records 366 to reflect the new condition, as indicated at block 1118. The new sync record is then transmitted to the standby supervisor 204 in a similar manner as described above, as indicated at block 1120.

Upon completing their processing of the event, the CLI task and application 354 each issue an eventComplete( ) call to the event manager 334, as indicated at block 1122 (FIG.

11B). The event manager 334 clears the CLI task and application 354 from its pending events table 800, as indicated at block 1124, and sends EVENT_COMPLETE messages to the standby supervisor 204, as indicated at block 1126. The standby supervisor clears the CLI task and application 354 from its pending events table, as indicated at block 1128. The active and the standby supervisors 202 and 204 then close the event, as indicated at block 1130.

As shown, the synchronization of information from the active to the standby supervisors 202 and 204 in response to protocol, system and external events preferably takes place asynchronously so as to minimize their effects on the run-time performance of the switch 126. Furthermore, the existence of a single SYNC_Q 350 at the active supervisor 202 ensures consistent ordering between the active and the standby supervisors 202 and 204. That is, the order in which changes take place on the active supervisor 202 is the same as the order in which those changes take place on the standby supervisor 204.

Switchover from Active to Standby Supervisors

Figure 12A:
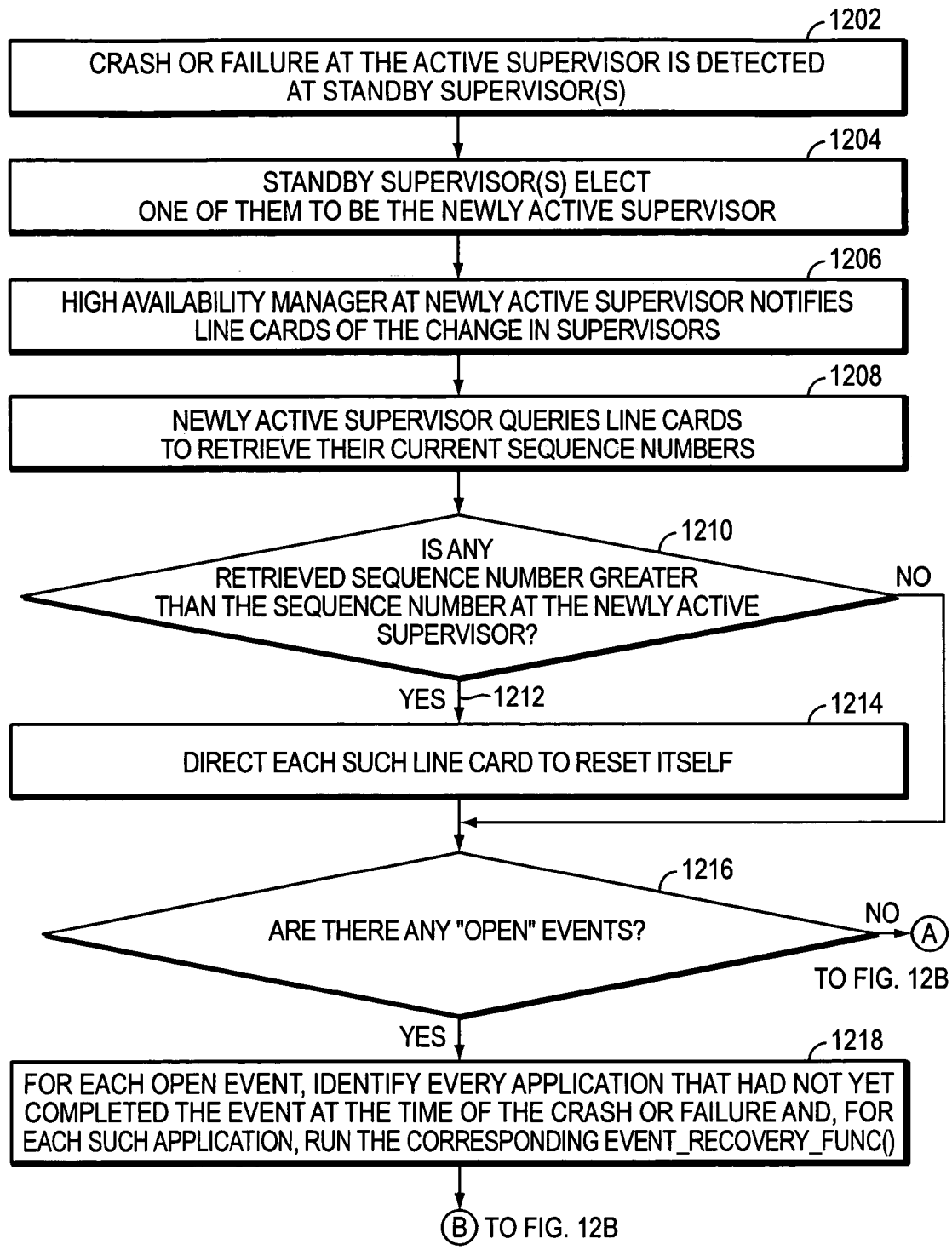

If a failure occurs at the active supervisor 202, the standby supervisor 204 preferably continues the switching and other operations of the switch 126 with little or no disruption to the bridged computer network 200. FIG. 12 is a flow diagram of the preferred steps taken by switch 126 during a switchover of supervisor cards. First, the active supervisor 202 crashes or fails, and that crash or failure is detected by the standby supervisor(s), e.g., supervisor 202, as indicated at block 1202. It should be understood that the supervisors 202 and 204 may each include failure detection modules or circuits for this purpose. If there are multiple standby supervisors, one of them is elected to be the newly active supervisor, as indicated at block 1204.

The standby supervisor(s) 204, in addition to processing events, as described above, also keeps track of which line cards or modules of switch 126 are running, i.e., which line cards are on-line. Following the crash or failure of the active supervisor 202, the high availability manager 328 at the standby 204 notifies each line card 206 and 208 that it is the newly active supervisor and that the line cards 206 and 208 should, from this point forward, send messages to supervisor 204, as indicated at block 1206. The newly active supervisor 204 also conducts a "consistency check" on each line card 206 and 208. In particular, supervisor 204 queries each line card 206 and 208 for their sequence numbers, as indicated at block 1208. To perform these tasks, the newly active supervisor 204 may send a SWITCH_SEQ SCP command message to each of the line cards 206 and 208, which contains the address of supervisor card 204. Each line card 206 and 208 responds by sending its current sequence number to the newly active supervisor card 204.

The high availability manager 328 then compares the retrieved sequence numbers to the sequence number stored at its sequence database 344. More specifically, the high availability manager 328 determines whether any of the sequence numbers from the line cards 206 and 208 is greater than its sequence number, as indicated at decision block 1210. Suppose, for example, that the last sequence number provided to the standby supervisor 204 before the active supervisor 202 crashed was sequence number "21". If the sequence number stored at each of the line cards 206 and 208 is less than or equal to this sequence number (i.e., "21"), then the high availability manager 328 "knows" that all of the state or condition information stored at each line card 206 and 208 is consistent with the state or condition information stored in the sync records 378, 380, 382 and 384 of the synchronization databases 370, 372, 374 and 376 at the newly active supervisor 204.

If, however, a line card, such as line card 208, returns a sequence number (e.g., "22") that is greater than the sequence number at sequence database 344 of the newly active supervisor 204, then the high availability manager 328 concludes that at least one change was implemented by line card 206, but was never received by the newly active supervisor 204. Since the newly active supervisor 204 cannot "recover" this change, it preferably responds by directing the respective line card (i.e., line card 208) to reset all of its state or condition information, as indicated by Yes arrow 1212 leading to block 1214.

Following the line card "consistency check" and the resetting of those line cards, if any, that failed the consistency check, the high availability manager 328 at the newly active supervisor 204 next proceeds to determine whether any events are still "open", as indicated at block 1218. In particular, the high availability manager 328 examines the pending events table 800 at its event database 340. As described above, when producing and listening applications complete their processing of event instances, they issue eventComplete( ) API calls, which result in those applications being cleared from the pending events table 800 for the respective event at both supervisor cards 202 and 204.

After a crash or failure of the active supervisor, an event may be open at the newly active supervisor 204 for several reasons. For example, the application at the previously active supervisor 202 may not have completed its processing of the subject event prior to the supervisor 202 crashing or failing. Alternatively, the application may have completed its processing of the subject event but not yet issued an eventComplete( ) API call or, if the eventComplete( ) call was issued, the previously active supervisor 202 may not yet have issued a corresponding EVENT_COMPLETE message to the then standby 204. In either case, the newly active supervisor 204 considers the subject event to be an open event. By applying one or more Boolean operations to the two bit maps created for each event, the high availability manager 328 can quickly determine which applications, if any, did not complete their processing of each event. If there are one or more applications which have yet to be cleared for any event, as reflected in the pending events table 800 at the newly active supervisor 204, then the high availability manager 328 preferably takes some recovery action.

More specifically, as described above, for each event type that an application defines or registers as a listener, the application also defines an event_recovery_func( ). For each open event that was identified at step 1216, the high availability manager 328 executes or calls for execution by the application the event_recovery_func( ) specified by the application that had yet to complete the event prior to the crash or failure of the previously active supervisor 202, as indicated at block 1218. The event_recovery_func( ) preferably restores the logical synchronization database for the respective application to a consistent state. For the Spanning Tree Protocol (STP), for example, the event_recovery_func( ) may be a redo operation. Specifically, if the STP application has not completed a PORT_CHANGE_STATE event at the time the active supervisor 202 crashes or fails, the new spanning tree port state from the open event is saved at the standby supervisor 204, and an SCP set command is sent to the line card for the respective port in order to set the port's state to the new spanning tree port state. Even if the active supervisor 202 had sent such an SCP set command before crashing or failing, re-sending it is harmless. For DTP and PAgP, the event_recovery_func( )s may be reset operations. Thus, if a DTP or PAgP NEGOTIATION event is open following a crash or failure of the active supervisor 202, the respective port(s) or line card(s) are preferably reset.

The newly active supervisor 204, as part of its recovery functions following the crash or failure of the active supervisor 206, may also build one or more switchover databases. The switchover database may indicate which line cards, if any, failed the consistency check and thus must be re-stared. It may also list all of the open events and specify the corresponding event_recovery_func( )s that must be executed.

Figure 12B:
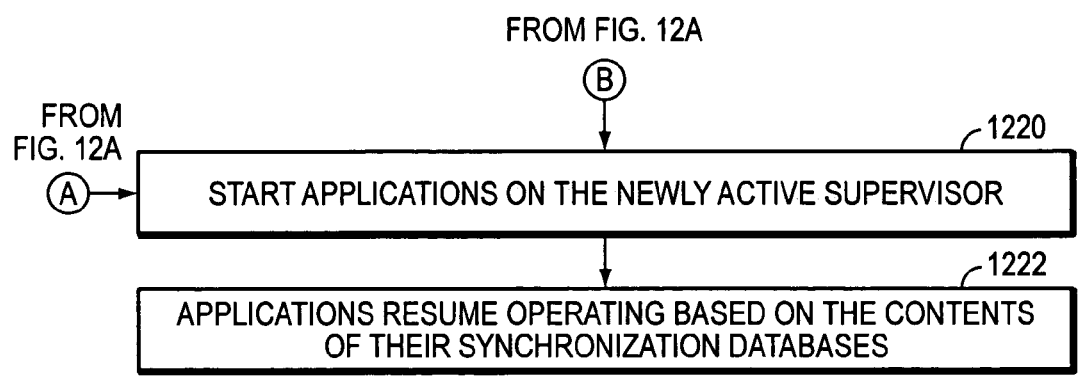

Upon completing the consistency check and responding to any open events, the newly active supervisor 204 starts or wakes up the applications loaded onto supervisor 204, as indicated at block 1220 (FIG. 12B). Rather than starting from an initialization state, however, these applications start running based on the contents of their corresponding synchronization databases at the newly active supervisor 204, as indicated at block 1222. That is, the applications begin running based on the state or other condition information that was synchronized to the newly active supervisor 204 before it became the active supervisor and determined to be valid. Accordingly, the applications do not waste time starting over from initialization states. Switch 126 can thus resume forwarding messages with little disruption despite the crash or failure of the previously active supervisor 202.

As part of the switchover process, the high availability manager 328 at the newly active supervisor 204 preferably creates a table or other data structure that has a record or cell for each port 230 at switch 126. As each application performs its recovery functions, e.g., the event_recovery_func( ), it may determine that one or more ports 230 should be brought down and reinitialized. If so, the application preferably identifies or marks that port in the data structure created by the high availability manager 328, unless that port has already been marked by some other application. When the applications have all completed their recovery functions, the high availability manager 328 checks this table or data structure and brings down and reinitializes all of the designated ports. For example, one application, e.g., DTP, may conclude that no action need be taken in response to the active supervisor crashing or failing, while a second application, e.g., PAgP, may determine that a port or an entire line card must be restarted. The applications, e.g., DTP, may also check this data structure so as to learn whether any ports or line cards are to be restarted.

Hot-Swapping of Supervisor Cards/Global Synchronization

The present invention is also able to support the hot swapping of supervisor cards. The term hot swapping refers to the replacement of components, in this case supervisor cards, without having to shut-down and restart the affected equipment, in this case the switch. Suppose, for example, after failing, that supervisor card 202 is removed, and later on a new supervisor card, which will also be referred to by designation number 202 for simplicity, is installed into switch 126. Each application that utilizes the high availability facilities of the present invention, in addition to defining an event_recovery_func( ) among others, also defines a global_sync_func( ) which is used to synchronize all of the application's sync records to the standby supervisor. Furthermore, the high availability managers also maintain a global_sync_done flag for each sync record. Initially, the global_sync_done flag for every sync record is deasserted or set to false.

When the high availability manager 328 at the currently active supervisor 204 determines that a new supervisor 202 has been inserted, e.g., "hot" inserted, it begins calling the global_sync_func( ) defined by each application so as to synchronize the synch records for each application to the current standby supervisor 202. Execution of the global_sync_func( ) for a given application may result in the application calling a series of ha_tx_sync( ) functions. Each of the ha_tx_sync( ) functions may take a particular sync record, generate a corresponding SYNC_RECORD_MESSAGE 900 containing that sync record and place the SYNC_RECORD_MESSAGE 900 in the SYNC_Q 351.

From the SYNC_Q 351 the SYNC_RECORD_MESSAGE 900 is sent to the current standby supervisor 202 where it is unpacked. That is, the SYNC_RECORD_MESSAGE causes the corresponding sync record at the current standby supervisor 202 to be updated. After the application has synchronized a given sync record to the current standby supervisor 202, it may call a get function and a set function in order to assert or set to true the global_sync_done flag for the given sync record. This process is repeated by each application at the current active supervisor 204. Once a given sync record has been synchronized to the standby supervisor 202 and the corresponding flag has been set to true, the application can, in response to one or more protocol events, call the ha_tx_sync( ) function in order to update that record. Until the global_sync_done flag is set to true for a given sync record, the application is preferably precluded from issuing any ha_tx_sync( ) functions (other than in connection with a global sync operation) for that sync record.

It should be understood that multiple sync records may be merged or grouped into a composite record. All of the sync records of this composite record may then be synchronized to the current standby supervisor 204 by calling a single instance of the ha_tx_sync( ) function on the composite record.

It should be further understood that the high availability entities 302 and 304 and/or the sequence databases 342 and 344 preferably implement some type of wrap-around function or process when the sequence number wraps around from its highest value to its lowest value. Suitable wrap-around solutions for use with the present invention are well-known to those skilled in the art.

Although the invention has been described in connection with applications operating at layers 2 and 3 of the Open Systems Interconnection (OSI) Reference Model, it should be understood that it may be used with applications, protocols or processes operating at other layers. In addition, the high availability facilities of the present invention could be used by two separate intermediate network devices or entities in order to share or synchronize information between them.

The foregoing description has been directed to specific embodiments of this invention. It will be apparent, however, that other variations and modifications may be made to the described embodiments, with the attainment of some or all of their advantages. For example, other communication architectures or paradigms, besides event-based architectures, such as primitives, commit protocols, etc., may be employed by the active and standby supervisor cards to exchange information relating to the spanning tree protocol. Therefore, it is an object of the appended claims to cover all such variations and modifications as come within the true spirit and scope of the invention.

What is claimed is:

1. In an intermediate network device having at least one line card defining a plurality of ports for receiving and forwarding messages and two or more supervisors, each supervisor configured to run one or more applications to facilitate message handling by the network device, a method for continuing operation of at least one application despite a crash or failure, the method comprising the steps of:
designating a first supervisor to be an active supervisor and a second supervisor to be a standby supervisor for the network device;
executing the at least one application at the active supervisor;
holding the at least one application at the standby supervisor in a dormant state;
transmitting state information generated during execution of the at least one application from the active supervisor to the standby supervisor;
storing the state information at the standby supervisor;
in response to the standby supervisor detecting a crash or failure at the active supervisor, carrying on execution of the at least one application at the standby supervisor based upon at least some of the stored state information;
generating a sequence number for use in instructing the at least one line card to change operating condition;
sending the sequence number to the at least one line card with the instruction;
storing the sequence number at the at least one line card;
sending the sequence number to the standby supervisor;
storing the sequence number at the standby supervisor; and
in response to the standby supervisor detecting the crash or failure of the active supervisor, comparing the sequence number stored at the standby supervisor with the sequence number at the at least one line card.

2. The method of claim 1 further comprising the step of defining a synchronization database having one or more synchronization records at the active supervisor, wherein the synchronization records store state information to be transmitted to the standby supervisor.

3. The method of claim 2 further comprising the step of updating one or more of the synchronization records in response to an operating change at the at least one application program.

4. The method of claim 3 wherein the transmitting step comprises the step of sending the one or more updated synchronization records to the standby supervisor.

5. The method of claim 1 further comprising the step of continuing operation of the at least one line card, following the crash or failure of the active supervisor, if the sequence number stored at the at least one line card is one of (a) less than or equal to or (b) greater than the sequence number stored at the standby supervisor.

6. The method of claim 5 further comprising the step of resetting the at least one line card, following the crash or failure of the active supervisor, if the sequence number stored at the at least one line card is one of (a) greater than or (b) less than or equal to the sequence number stored at the standby supervisor.

7. The method of claim 1 further comprising the steps of:
determining the validity of the state information stored at the standby supervisor following the crash or failure of the active supervisor; and
blocking the at least one application from utilizing state information determined to be invalid in its execution.

8. In an intermediate network device having at least one line card defining a plurality of ports for receiving and forwarding messages and two or more supervisors, each supervisor configured to run one or more applications to facilitate message handling by the network device, a method for continuing operation of at least one application despite a crash or failure, the method comprising the steps of:
designating a first supervisor to be an active supervisor and a second supervisor to be a standby supervisor for the network device;
executing the at least one application at the active supervisor;
holding the at least one application at the standby supervisor in a dormant state;
transmitting state information generated during execution of the at least one application from the active supervisor to the standby supervisor;
storing the state information at the standby supervisor;
in response to the standby supervisor detecting a crash or failure at the active supervisor, carrying on execution of the at least one application at the standby supervisor based upon at least some of the stored state information;
creating, at the active supervisor, an instance of an event in response to a request from an application;
providing the event instance to the requesting application for processing;
providing the event instance to any listening applications that have registered for the event for processing;
passing the event instance to the standby supervisor;
receiving notifications from the requesting and listening applications that they have completed their processing of the event instance;
passing the notifications to the standby supervisor; and
in response to the standby supervisor receiving notifications from the requesting and all listening applications, closing the event instance at the active and standby supervisors.

9. The method of claim 8 further comprising the step of:
in response to the standby supervisor detecting the crash or failure of the active supervisor, determining whether one or more event instances passed to the standby supervisor remain open;
for a given event instance that remains open, identifying the requesting and listening applications that have not completed their processing of the given event instance;
for each requesting and listening application that has not completed its processing of the given event instance, calling a recovery function defined by the respective application to handle the open event instance.

10. A method for operating a network device, comprising:
operating an active supervisor, the active supervisor creating an event instance in response to a change in operating state from a requesting application;
providing, by the active supervisor, the event instance to the requesting application and listening applications that have registered for the event for processing;
passing, by the active supervisor, the event instance to a standby supervisor;
subsequent to the steps of providing and passing, receiving, at the active supervisor, notifications from the requesting and listening applications that the requesting and listening applications have completed processing of the event instance;
passing, by the active supervisor, the notifications to the standby supervisor; and in response to receiving the notifications from the requesting and all listening applications, closing the event instance at the active and standby supervisors.

11. The method of claim 10, further comprising:

in response to a failure of the active supervisor, determining whether one or more event instances passed to the standby supervisor remain open;

identifying the requesting and listening applications, if any, that have not completed their processing of an open event instance; and calling a recovery function defined by the respective application to handle the open event instance.

12. A network device, comprising:

an active supervisor to run applications, the active supervisor to create an event instance in response to a change in operating state from a requesting application, to provide the event instance to the requesting application and listening applications that have registered for the event for processing, and subsequent to providing the event instance, to receive notifications from the requesting and listening applications that the requesting and listening applications have completed processing of the event instance; and a standby supervisor to receive the event instance and the notifications from the active supervisor, where in response to receiving notifications from the requesting and all listening applications, the active and standby supervisors are to close the event instance.

13. The network device of claim 12, further comprising:

in response to the standby supervisor detecting a failure of the active supervisor, the standby supervisor is further to determine whether one or more event instances passed to the standby supervisor remain open, to identify the requesting and listening applications, if any, that have not completed their processing of an open event instance, and to call a recovery function defined by the respective application to handle the open event instance.

14. A network device, comprising:

means for operating an active supervisor, the active supervisor creating an event instance in response to a change in operating state from a requesting application;

means for providing, by the active supervisor, the event instance to the requesting application and any listening applications that have registered for the event for processing;

means for passing, by the active supervisor, the event instance to a standby supervisor;

means for receiving, at the active supervisor, subsequent to the providing and passing, notifications from the requesting and listening applications that the requesting and listening applications have completed processing of the event instance;

means for passing, by the active supervisor, the notifications to the standby supervisor; and means for in response to receiving notifications from the requesting and all listening applications, closing the event instance at the active and standby supervisors.

15. The network device of claim 14, further comprising:

in response to the standby supervisor detecting a failure of the active supervisor, means for determining whether one or more event instances passed to the standby supervisor remain open;

means for identifying the requesting and listening applications, if any, that have not completed their processing of an open event instance; and means for calling a recovery function defined by the respective application to handle the open event instance.

16. A computer readable media, comprising: the computer readable media containing instructions for execution on a processor for the practice of the method of, operating an active supervisor, the active supervisor creating an event instance in response to a change in operating state from a requesting application;

providing, by the active supervisor, the event instance to the requesting application and listening applications that have registered for the event for processing;

passing, by the active supervisor, the event instance to a standby supervisor;

subsequent to the steps of providing and passing, receiving, at the active supervisor, notifications from the requesting and listening applications that the requesting and listening applications have completed processing of the event instance;

passing, by the active supervisor, the notifications to the standby supervisor; and in response to receiving notifications from the requesting and all listening applications, closing the event instance at the active and standby supervisors.

17. The computer readable media of claim 16, further carrying instructions for the method of, in response to the standby supervisor detecting a failure of the active supervisor, determining whether one or more event instances passed to the standby supervisor remain open;

identifying the requesting and listening applications, if any, that have not completed their processing of an open event instance; and calling a recovery function defined by the respective application to handle the open event instance.

18. Electromagnetic signals propagating on a computer network, comprising: the electromagnetic signals carrying instructions for execution on a processor for the practice of the method of, operating an active supervisor, the active supervisor creating an event instance in response to a change in operating state from a requesting application;

providing, by the active supervisor, the event instance to the requesting application and listening applications that have registered for the event for processing;

passing, by the active supervisor, the event instance to a standby supervisor;

subsequent to the steps of providing and passing, receiving, at the active supervisor, notifications from the requesting and listening applications that the requesting and listening applications have completed processing of the event instance;

passing, by the active supervisor, the notifications to the standby supervisor; and in response to receiving notifications from the requesting and all listening applications, closing the event instance at the active and standby supervisors.

19. The electromagnetic signals of claim 18, further carrying instructions for the method of, in response to the standby supervisor detecting a failure of the active supervisor, determining whether one or more event instances passed to the standby supervisor remain open;

identifying the requesting and listening applications, if any, that have not completed their processing of an open event instance; and calling a recovery function defined by the respective application to handle the open event instance.

* * * * *